United States Patent
Miyahara et al.

(10) Patent No.: US 11,954,812 B2
(45) Date of Patent: Apr. 9, 2024

(54) PREPROCESSING DEVICE, DETERMINATION SYSTEM, PREPROCESSING METHOD, AND PREPROCESSING PROGRAM

(71) Applicant: NIPPON TELEGRAPH AND TELEPHONE CORPORATION, Tokyo (JP)

(72) Inventors: Kazuhiro Miyahara, Musashino (JP); Tatsuro Kimura, Musashino (JP); Ichibe Naito, Musashino (JP); Atsushi Isomura, Musashino (JP); Tomoya Ikeda, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 91 days.

(21) Appl. No.: 17/640,354

(22) PCT Filed: Sep. 12, 2019

(86) PCT No.: PCT/JP2019/035988
§ 371 (c)(1),
(2) Date: Mar. 4, 2022

(87) PCT Pub. No.: WO2021/048992
PCT Pub. Date: Mar. 18, 2021

(65) Prior Publication Data
US 2022/0327791 A1    Oct. 13, 2022

(51) Int. Cl.
*G06T 19/20* (2011.01)
*G06T 17/20* (2006.01)

(52) U.S. Cl.
CPC ............. *G06T 19/20* (2013.01); *G06T 17/20* (2013.01); *G06T 2219/2016* (2013.01)

(58) Field of Classification Search
CPC ..... G06T 17/20; G06T 2210/21; G06T 19/20; G06T 2210/12; G06T 2219/2016; G06T 17/05
See application file for complete search history.

(56) References Cited

U.S. PATENT DOCUMENTS

| | | | | |
|---|---|---|---|---|
| 5,910,807 A | * | 6/1999 | Ueda ................. | G06T 11/40 345/441 |
| 6,155,924 A | * | 12/2000 | Nakagawa ............ | A63F 13/812 463/2 |

(Continued)

FOREIGN PATENT DOCUMENTS

| JP | 63-118982 A | 5/1988 |
|---|---|---|
| JP | 7-182532 A | 7/1995 |

OTHER PUBLICATIONS

Sunday, "Inclusion of a Point in a Polygon", Surfer.Org, Available Online at: http://geomalgorithms.com/a03-inclusion.html, Retrieved on Aug. 23, 2019, 6 pages.

(Continued)

*Primary Examiner* — Phi Hoang
(74) *Attorney, Agent, or Firm* — XSENSUS LLP

(57) ABSTRACT

A preprocessing device includes processing circuitry configured to acquire coordinate information of respective vertexes of a polygon for inside/outside determination and the coordinate information of the respective vertexes of the polygon for inside/outside determination and rotate a coordinate to be determined and the polygon for inside/outside determination as preprocessing of determination processing of determining whether the coordinate to be determined exists inside or outside the polygon for inside/outside determination, and output coordinate information of respective vertexes of the rotated polygon for inside/outside determination and the rotated coordinate to be determined as rotated coordinate information.

19 Claims, 30 Drawing Sheets

(56) References Cited

U.S. PATENT DOCUMENTS

| | | | | |
|---|---|---|---|---|
| 6,320,580 | B1* | 11/2001 | Yasui | G06T 15/40 |
| | | | | 345/421 |
| 8,374,391 | B1* | 2/2013 | Erignac | G06V 20/176 |
| | | | | 382/103 |
| 2015/0054714 | A1* | 2/2015 | Haubner | G09B 9/00 |
| | | | | 345/1.3 |
| 2016/0260162 | A1* | 9/2016 | Streich | G06Q 30/06 |
| 2020/0142384 | A1* | 5/2020 | Bressler | B33Y 50/00 |

OTHER PUBLICATIONS

Sunday, "Bounding Containers for Point Sets", Surfer.Org, Available Online at: http://geomalgorithms.com/a08-_containers.html, Retrieved on Aug. 23, 2019, pp. 1-9.

"Ramer-Douglas-Peucker Algorithm", Siguniang's Blog, Available Online at: https://siguniang.wordpress.com/2012/07/16/ramer-douglaspeucker-algorithm/, Jul. 16, 2012, 6 pages including English Translation.

Eberly et al., "Minimum-Area Rectangle Containing a Set of Points", Geometric Tools, Available Online at: https://www.geometrictools.com/Documentation/MinimumAreaRectangle.pdf, Feb. 14, 2019, pp. 1-14.

Kirkpatrick et al., "Polygon triangulation in O (n log logn) time with simple data structures", Discrete & Computational Geometry, vol. 7, Issue 4, Available Online at: https://link.springer.com/article/10.1007%2FBF02187846, Apr. 1992, pp. 329-346.

\* cited by examiner

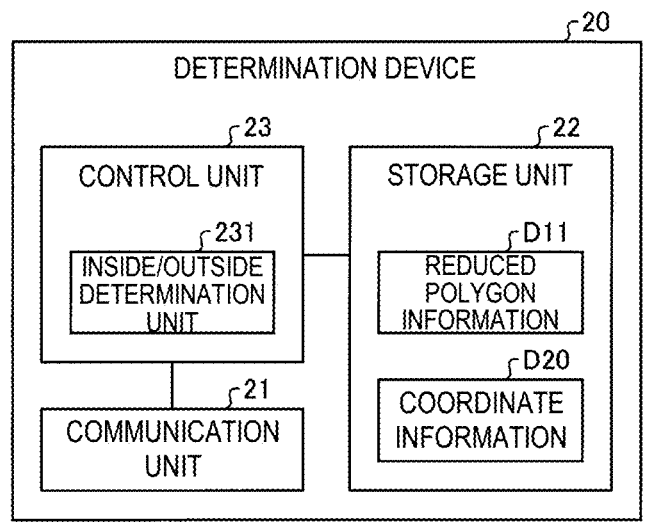

ND PREPROCESSING PROGRAM

PREPROCESSING DEVICE, DETERMINATION SYSTEM, PREPROCESSING METHOD, A

CROSS-REFERENCE TO RELATED APPLICATION

The present application is based on PCT filing PCT/JP2019/035988, filed Sep. 12, 2019, the entire contents of which are incorporated herein by reference.

TECHNICAL FIELD

The present invention relates to a preprocessing device, a determination system, a preprocessing method, and a preprocessing program.

BACKGROUND ART

There is a polygon inside/outside determination technology for determining whether a specific coordinate is included inside a specific polygon. The polygon inside/outside determination technology is applied, for example, in a case where whether a geographical coordinate of an automobile, or the like, is included in a polygon which expresses a road area is determined.

Examples of the polygon inside/outside determination technology in related art can include determination technologies using a Crossing Number method and a Winding Number method (see, for example, Non-Patent Literature 1). These determination technologies determine whether a coordinate is included inside a polygon by calculating positional relationship between all sides of the polygon to be determined and a coordinate to be determined.

Further, examples of the polygon inside/outside determination technology in related art can include a simple determination technology using a bounding container (see, for example, Non-Patent Literature 2). This bounding container is such a figure that includes a polygon to be determined. This technology reduces average processing time by selecting a figure which enables high-speed execution of inside/outside determination as the bounding container and applying the Crossing Number method and the Winding Number method only to coordinates included in the bounding container. A rectangle (MBR: Minimal Bounding Rectangle) having sides parallel to an XY axis is typically used as the above-described bounding container.

CITATION LIST

Non-Patent Literature

Non-Patent Literature 1: "Inclusion of a Point in a Polygon", online, Accessed Aug. 23, 2019, Retrieved from: http://geomalgorithms.com/a03-_inclusion.html Non-Patent Literature 2: "Bounding Containers for Point Sets", online, Accessed Aug. 23, 2019, Retrieved from: http://geomalgorithms.com/a08-_containers.html

SUMMARY OF THE INVENTION

Technical Problem

In a case where the polygon inside/outside determination technology is applied to determination as to whether or not a geographical automobile, or the like, is included in a road area, this polygon has a number of vertexes and has an elongated shape to express the road area.

However, the Crossing Number method and the Winding Number method have a problem that if determination is performed on a polygon having a number of vertexes, processing time becomes longer, because the processing time is proportional to the number of vertexes. Further, the MBR has a problem that if determination is performed on a polygon having an elongated shape, average processing time is less likely to be shortened, because the MBR also includes many regions outside the elongated polygon.

The present invention has been made in view of the above, and an object of the present invention is to provide a preprocessing device, a determination system, a preprocessing method, and a preprocessing program which can shorten processing time required for polygon inside/outside determination processing.

Means for Solving the Problem

To solve the above-described problems and achieve the object, a preprocessing device of the present invention includes processing circuitry configured to: acquire coordinate information of respective vertexes of a polygon for inside/outside determination and the coordinate information of the respective vertexes of the polygon for inside/outside determination and rotate a coordinate to be determined and the polygon for inside/outside determination as preprocessing of determination processing of determining whether the coordinate to be determined exists inside or outside the polygon for inside/outside determination, and output coordinate information of respective vertexes of the rotated polygon for inside/outside determination and the rotated coordinate to be determined as rotated coordinate information.

Further, a determination system of the present invention is a determination system which includes a determination device including processing circuitry configured to perform determination processing of determining whether a coordinate to be determined exists inside or outside a polygon for inside/outside determination, and a first preprocessing device including first processing circuitry configured to perform preprocessing of the determination processing, the first processing circuitry being configured to: acquire coordinate information of respective vertexes of the polygon for inside/outside determination and the coordinate information of the respective vertexes of the polygon for inside/outside determination and rotate the coordinate to be determined and the polygon for inside/outside determination as preprocessing, and output coordinate information of respective vertexes of the rotated polygon for inside/outside determination and the rotated coordinate to be determined as rotated coordinate information, the processing circuitry being configured to determine whether the coordinate to be determined exists inside or outside the polygon for inside/outside determination using information after the preprocessing.

Further, a preprocessing method of the present invention is a preprocessing method acquiring coordinate information of respective vertexes of a polygon for inside/outside determination and the coordinate information of the respective vertexes of the polygon for inside/outside determination and rotating a coordinate to be determined and the polygon for inside/outside determination as preprocessing of determination processing of determining whether the coordinate to be determined exists inside or outside the polygon for inside/outside determination, by processing circuitry, and outputting coordinate information of respective vertexes of the rotated polygon for inside/outside determination and the rotated coordinate to be determined as rotated coordinate information.

Further, a non-transitory computer-readable recording medium stores therein a preprocessing program of the present invention that causes a computer to execute a process including: acquiring coordinate information of respective vertexes of a polygon for inside/outside determination and the coordinate information of the respective vertexes of the polygon for inside/outside determination and rotating a coordinate to be determined and the polygon for inside/outside determination as preprocessing of determination processing of determining whether the coordinate to be determined exists inside or outside the polygon for inside/outside determination, and outputting coordinate information of respective vertexes of the rotated polygon for inside/outside determination and the rotated coordinate to be determined as rotated coordinate information.

Effects of the Invention

According to the present invention, it is possible to shorten processing time required for polygon inside/outside determination processing.

BRIEF DESCRIPTION OF DRAWINGS

FIG. 4 is a block diagram illustrating an example of a configuration of a determination device illustrated in FIG. 1.

FIG. 5 is a view illustrating a list of data configurations of coordinate information.

DESCRIPTION OF EMBODIMENTS

Embodiments of a preprocessing device, a determination system, a preprocessing method and a preprocessing program according to the present invention will be described in detail below on the basis of the drawings. Further, the present invention is not limited to the embodiments described below.

[First embodiment] First, a first embodiment will be described. In the first embodiment, processing time required for inside/outside determination processing is shortened by reducing vertexes of a polygon for inside/outside determination before the inside/outside determination processing of determining whether a coordinate to be determined exists inside or outside the polygon for inside/outside determination.

Figure 1:
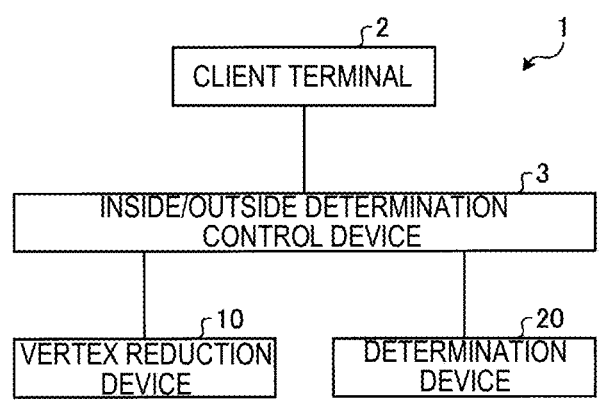
FIG. 1 is a block diagram illustrating an example of a configuration of a determination system according to a first embodiment.

[Configuration of determination system] FIG. 1 is a block diagram illustrating an example of a configuration of a determination system according to the first embodiment. As illustrated in FIG. 1, a determination system 1 according to the first embodiment includes a client terminal 2, an inside/outside determination control device 3, a vertex reduction device 10, and a determination device 20. The client terminal 2 is connected to the inside/outside determination control device 3 via a network, or the like. The inside/outside determination control device 3 is connected to the vertex reduction device 10 and the determination device 20 via a network, or the like.

The client terminal 2 is a terminal device to be used by a user of the determination system 1. The client terminal 2 transmits coordinate information D20 of a coordinate to be determined and polygon information D10 which is coordinate information of respective vertexes of a polygon for inside/outside determination to the inside/outside determination control device 3 and requests determination.

The inside/outside determination control device 3 is a server device which controls processing at the vertex reduction device 10 and the determination device 20. In a case where the inside/outside determination control device 3 receives a request for determination from the client terminal 2, the inside/outside determination control device 3 causes the determination device 20 to execute inside/outside determination processing (determination processing) of determining whether the coordinate to be determined exists inside or outside the polygon for inside/outside determination and returns a determination result to the client terminal 2. Further, in the present first embodiment 1, the inside/outside determination control device 3 causes the vertex reduction device 10 to execute preprocessing of the inside/outside determination processing before the determination device 20 executes the inside/outside determination processing.

The vertex reduction device 10 receives the polygon information D10 from the inside/outside determination control device 3 and executes preprocessing of reducing vertexes of the polygon for inside/outside determination. The vertex reduction device 10 outputs reduced polygon information D11 which is coordinate information of the respective vertexes of the polygon after the vertexes are reduced, to the inside/outside determination control device 3.

The determination device 20 performs inside/outside determination processing of determining whether the coordinate to be determined exists inside or outside the polygon for inside/outside determination. In this event, the determination device 20 performs the inside/outside determination processing on the basis of the reduced polygon information D11 and the coordinate information D20 of the coordinate to be determined. The determination device 20 outputs determination information including a determination result to the inside/outside determination control device 3.

Figure 2:
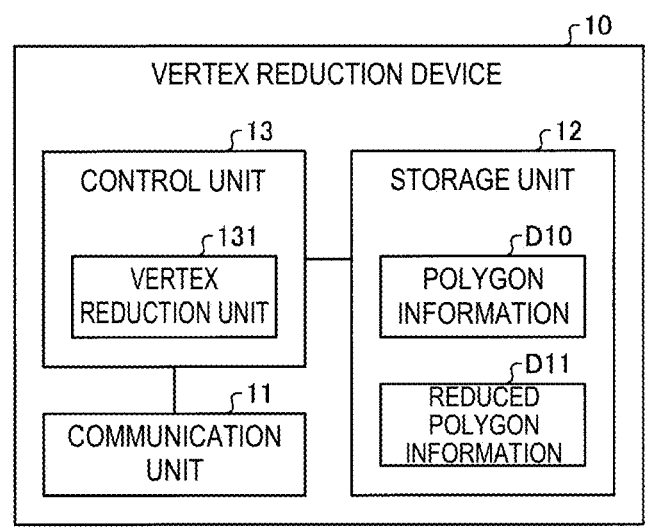
FIG. 2 is a block diagram illustrating an example of a configuration of a vertex reduction device illustrated in FIG. 1.

[Vertex reduction device] The vertex reduction device 10 illustrated in FIG. 1 will be described next. FIG. 2 is a block diagram illustrating an example of a configuration of the vertex reduction device 10 illustrated in FIG. 1. As illustrated in FIG. 2, the vertex reduction device 10 includes a communication unit 11, a storage unit 12 and a control unit 13.

The communication unit 11 is a communication interface which transmits/receives various kinds of information to and from other devices connected via a network, or the like. The communication unit 11 is implemented with a NIC (Network Interface Card), or the like, and performs communication between other devices and the control unit 13 (which will be described later) via a telecommunication line such as a LAN (Local Area Network) and the Internet.

The communication unit 11 receives the polygon information D10 from the inside/outside determination control device 3 via a network. Further, the communication unit 11 transmits the reduced polygon information D11 to the inside/outside determination control device 3.

The storage unit 12 is implemented with a semiconductor memory device such as a RAM (Random Access Memory) and a flash memory, or a storage device such as a hard disk and an optical disk and stores a processing program for causing the vertex reduction device 10 to operate, data to be used while the processing program is executed, or the like. The storage unit 12 stores the polygon information D10 and the reduced polygon information D11.

Figure 3:
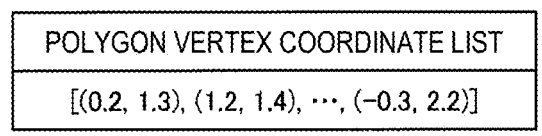
FIG. 3 is a view illustrating a list of data configurations of polygon information.

The polygon information D10 is coordinate information of the respective vertexes of the polygon for inside/outside determination. The polygon information D10 is transmitted from the inside/outside determination control device 3. FIG. 3 is a view illustrating a list of data configurations of the polygon information D10. As illustrated in FIG. 3, the polygon information D10 is a list of coordinates of the vertexes of the polygon for inside/outside determination, and, for example, has 100 sets of coordinates in a case where the polygon for inside/outside determination has 100 vertexes.

The reduced coordinate information D11 is coordinate information of the respective vertexes of the polygon whose vertexes are reduced through processing performed by the vertex reduction unit 131 (which will be described later) on the respective vertexes of the polygon for inside/outside determination. The reduced coordinate information D11 is, for example, a list of coordinates of the respective vertexes of the polygon whose vertexes are reduced from 100 to 60.

The control unit 13 controls the whole of the vertex reduction device 10. The control unit 13 is, for example, an electronic circuit such as a CPU (Central Processing Unit) and an MPU (Micro Processing Unit), or an integrated circuit such as an ASIC (Application Specific Integrated Circuit) and an FPGA (Field Programmable Gate Array). Further, the control unit 13 includes an internal memory for storing a program which specifies various kinds of processing procedure, and control data, and executes respective kinds of processing using the internal memory. The control unit 13 functions as various kinds of processing units by various kinds of programs running. The control unit 13 includes a vertex reduction unit 131 (reduction unit).

The vertex reduction unit 131 acquires the polygon information D10 and reduces the vertexes of the polygon for inside/outside determination as preprocessing of the inside/outside determination processing. The vertex reduction unit 131 performs processing of thinning the vertexes of the polygon for inside/outside determination at appropriate intervals. For example, the vertex reduction unit 131 implements vertex reduction processing using algorithm of Ramer-Douglas-Peucker (see, for example, Reference Literature 1).

Reference Literature 1: "Ramer-Douglas-Peucker Algorithm", online, Accessed Aug. 23, 2019, Retrieved from: https://siguniang.wordpress.com/2012/07/16/ramer-douglas-peucker-algorithm/

The vertex reduction unit 131 stores the reduced coordinate information D11 which is coordinate information of the respective vertexes of the polygon whose vertexes are reduced through vertex reduction processing performed on the respective vertexes of the polygon for inside/outside determination, in the storage unit 12 and outputs the reduced coordinate information D11 to the inside/outside determination control device 3 through the communication unit 11.

[Determination device] The determination device 20 illustrated in FIG. 1 will be described next. FIG. 4 is a block diagram illustrating an example of a configuration of the determination device 20 illustrated in FIG. 1. As illustrated in FIG. 4, the determination device 20 includes a communication unit 21, a storage unit 22, and a control unit 23.

The communication unit 21, which is a communication interface which transmits/receives various kinds of information to/from other devices connected via a network, or the like, is implemented with an NIC, or the like, and performs communication between other devices and the control unit 23 (which will be described later) via a telecommunication line such as a LAN and the Internet. The communication unit 21 receives the reduced polygon information D11 and receives the coordinate information D20 from the inside/outside determination control device 3 via a network as the coordinate information of the respective vertexes of the polygon for inside/outside determination. Further, the communication unit 21 transmits a determination result of the inside/outside determination unit 231 (which will be described later) to the inside/outside determination control device 3.

The storage unit 22 is implemented with a semiconductor memory device such as a RAM and a flash memory, or a storage device such as a hard disk and an optical disk and stores a processing program for causing the determination device 20 to operate, data to be used during execution of the processing program, or the like. The storage unit 22 stores the reduced polygon information D11 and the coordinate information D20.

The coordinate information D20 is coordinate information of the coordinate to be determined. The coordinate information D20 is transmitted from the inside/outside determination control device 3. FIG. 5 is a view illustrating a list of data configurations of the coordinate information D20. As illustrated in FIG. 5, the coordinate information D20 indicates longitude and latitude of the coordinate to be determined.

The control unit 23 controls the whole of the vertex reduction device 10. The control unit 23 is, for example, an electronic circuit such as a CPU and an MPU or an integrated circuit such as an ASIC and an FPGA. Further, the control unit 23 includes an internal memory for storing a program which specifies various kinds of processing procedure, and control data, and executes respective kinds of processing using the internal memory. Further, the control unit 23 functions as various kinds of processing units by various kinds of programs running. The control unit 23 functions as the inside/outside determination unit 231.

The inside/outside determination unit 231 performs inside/outside determination processing which determines whether the coordinate to be determined exists inside or outside the polygon for inside/outside determination on the basis of the reduced polygon information D11 and the coordinate information D20. The inside/outside determination unit 231 executes detailed determination using the Crossing Number method or the Winding Number method after simple determination using the MBR.

Figure 6:
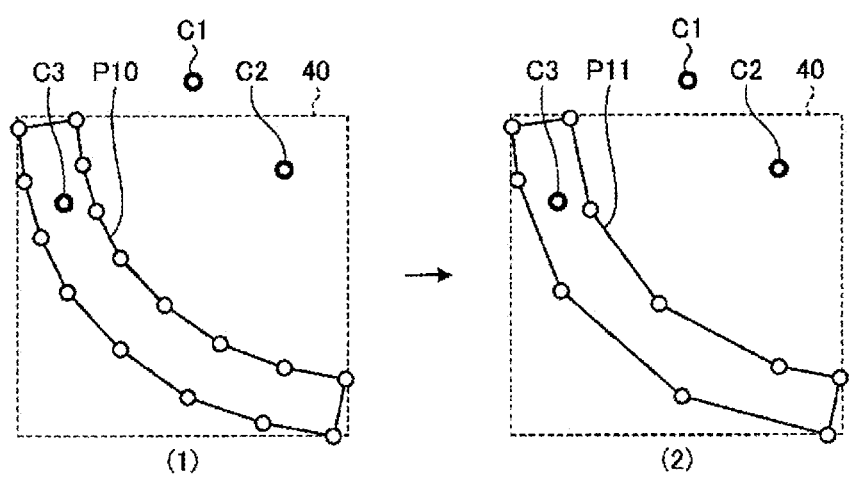
FIG. 6 is a view for explaining vertex reduction processing.

[Vertex reduction processing] The vertex reduction processing to be executed by the vertex reduction device 10 will be specifically described next. FIG. 6 is a view for explaining the vertex reduction processing. (1) of FIG. 6 indicates a polygon P10 for inside/outside determination before the vertex reduction processing. (2) of FIG. 6 indicates a polygon P11 after the vertex reduction processing. FIG. 6 also indicates an MBR 40 and coordinates C1, C2 and C3 to be determined for explanation.

The polygon P10 illustrated in (1) of FIG. 6 has 16 vertexes. The vertex reduction unit 131 of the vertex reduction device 10 reduces the vertexes of the polygon P10 using algorithm of Ramer-Douglas-Peucker. The algorithm of Ramer-Douglas-Peucker is algorithm of (A) setting a starting point and an end point of a route as plot targets, (B) obtaining distances between a line connecting the plot targets and respective points between the plot targets to find a point which is separate by equal to or greater than an allowable distance and which is the farthest point, (C) setting the point as a new plot target, recursively repeating processing of (B) and (C), and (D) ending if there is no point which is separate by equal to or greater than ε.

Through this processing, the vertex reduction unit 131 generates the polygon P11 whose vertexes are reduced to 10 compared to the polygon P10 having 16 vertexes as illustrated in (2) of FIG. 6. Then, the determination device 20 performs determination processing using this polygon P11 as the polygon for inside/outside determination.

In this case, detailed determination is executed on the coordinates C2 and C3 for which it is necessary to perform detailed determination on the basis of the polygon P11 whose vertexes are reduced, so that it is possible to shorten processing time for detailed determination processing compared to a case where detailed determination is performed on the original polygon P10 for inside/outside determination. Note that the coordinate C1 is located outside the MBR 40, and thus, determination ends after only the simple determination is performed.

[Processing Procedure of Determination Processing]

Figure 7:
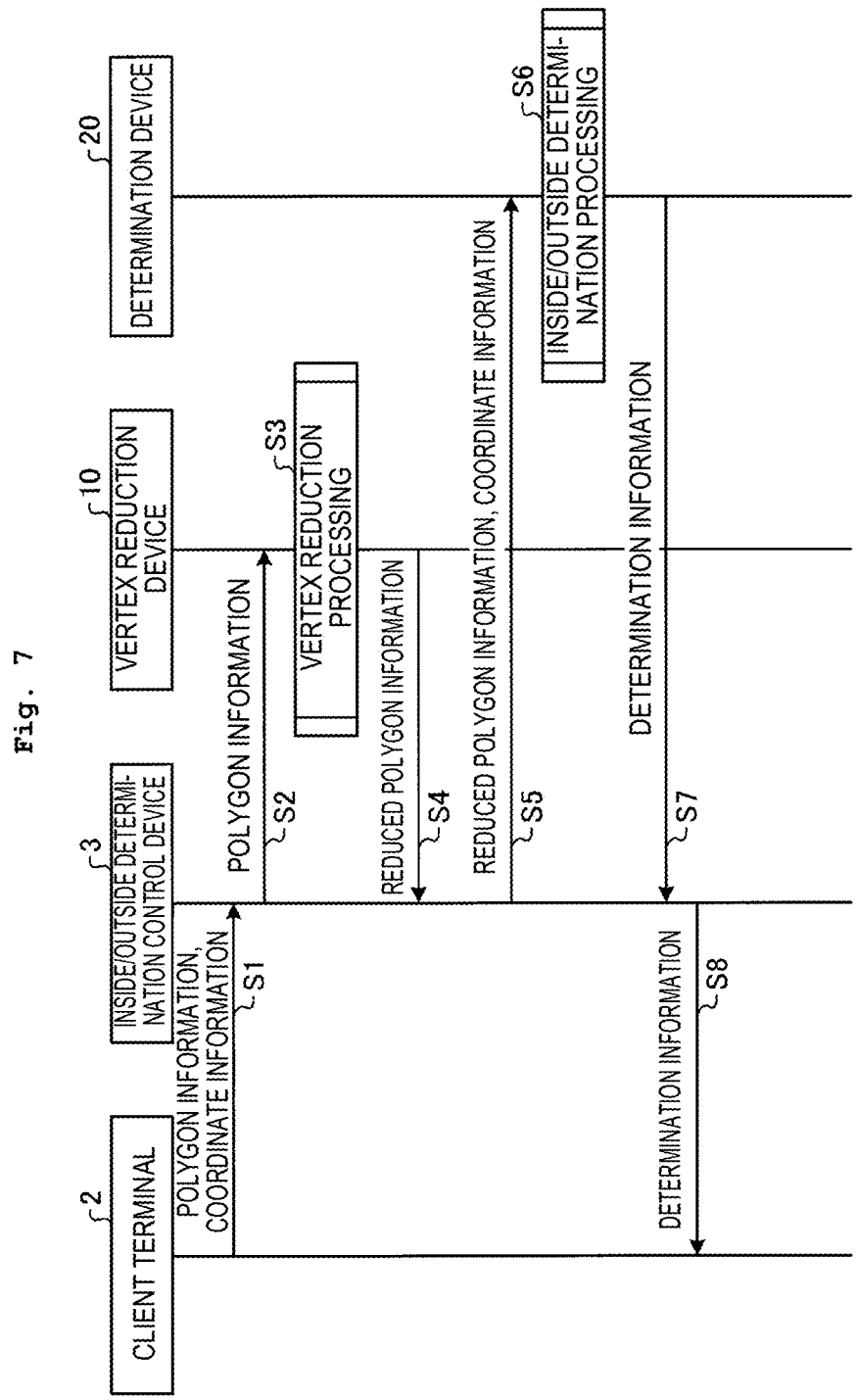
FIG. 7 is a sequence diagram for explaining processing procedure of determination processing by the determination system illustrated in FIG. 1.

Processing procedure of determination processing in the determination system 1 will be described next. FIG. 7 is a sequence diagram for explaining processing procedure of the determination processing by the determination system 1 illustrated in FIG. 1.

First, the client terminal 2 transmits the coordinate information D20 of the coordinate to be determined and the polygon information D10 which is coordinate information of the respective vertexes of the polygon for inside/outside determination to the inside/outside determination control device 3 and requests determination (step S1). When the inside/outside determination control device 3 receives the request for determination, the inside/outside determination control device 3 transmits the polygon information D10 to the vertex reduction device 10 (step S2) and causes the vertex reduction device 10 to execute preprocessing.

The vertex reduction device 10 executes the vertex reduction processing of reducing the vertexes of the polygon for inside/outside determination on the basis of the polygon information D10 received from the inside/outside determination control device 3 as the preprocessing (step S3) and transmits the reduced polygon information D11 to the inside/outside determination control device 3 (step S4).

The inside/outside determination control device 3 transmits the reduced polygon information D11 and the coordinate information D20 to the determination device 20 (step S5) and causes the determination device 20 to execute inside/outside determination processing. The inside/outside determination control device 3 performs the inside/outside determination processing on the basis of the reduced polygon information D11 and the coordinate information D20 (step S6) and transmits determination information to the inside/outside determination control device 3 (step S7). The inside/outside determination control device 3 transmits the determination information to the client terminal 2 (step S8).

[Processing Procedure of Vertex Reduction Processing]

Figure 8:
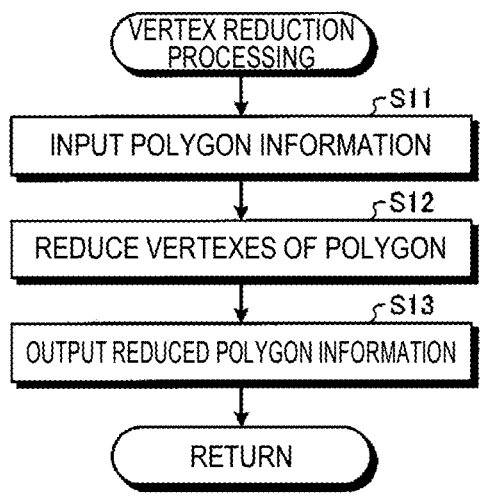
FIG. 8 is a flowchart illustrating processing procedure of the vertex reduction processing illustrated in FIG. 7.

Processing procedure of the vertex reduction processing (step S3) will be described next. FIG. 8 is a flowchart illustrating the processing procedure of the vertex reduction processing illustrated in FIG. 7.

As illustrated in FIG. 8, when the vertex reduction device 10 accepts input of the polygon information D10 from the inside/outside determination control device 3 (step S11), the vertex reduction device 10 reduces the vertexes of the polygon for inside/outside determination (step S12). The vertex reduction device 10 generates the reduced polygon information D11, outputs the reduced polygon information D11 to the inside/outside determination control device 3 (step S13) and finishes the vertex reduction processing.

Figure 9:
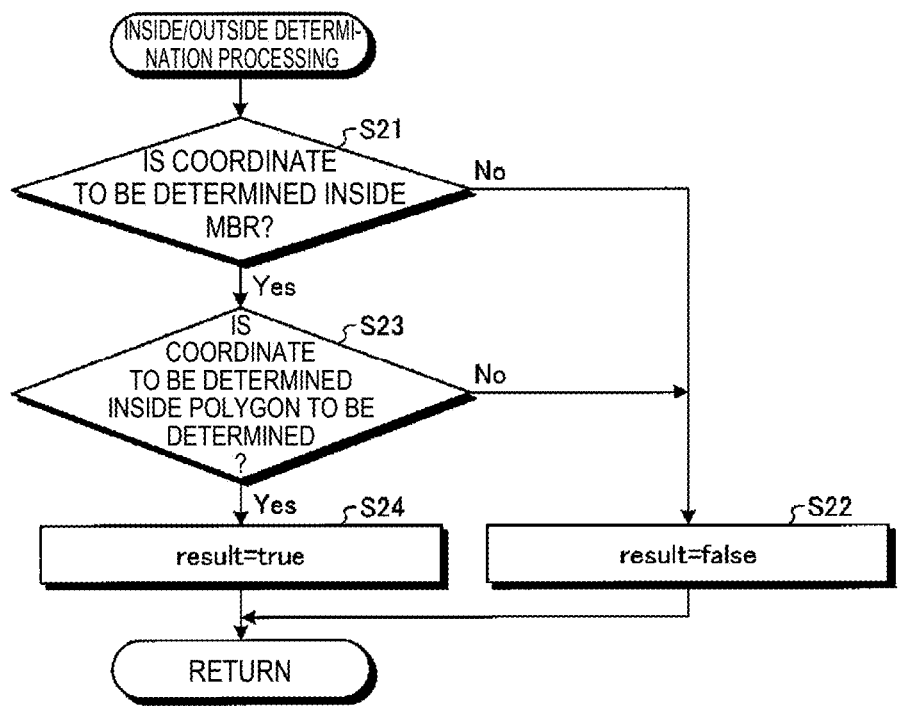
FIG. 9 is a flowchart illustrating processing procedure of inside/outside determination processing illustrated in FIG. 7.

[Processing procedure of inside/outside determination processing] Processing procedure of the inside/outside determination processing (step S6) will be described next. FIG. 9 is a flowchart illustrating the processing procedure of the inside/outside determination processing illustrated in FIG. 7.

As illustrated in FIG. 9, the determination device 20 performs simple determination processing of determining whether or not the coordinate to be determined is located inside the MBR (step S21). In a case where the determination device 20 determines that the coordinate to be determined is not located inside the MBR (step S21: No), the determination device 20 determines that this coordinate is located outside the polygon for inside/outside determination ("false") (step S22).

On the other hand, in a case where the determination device 20 determines that the coordinate to be determined is located inside the MBR (step S21: Yes), the determination device 20 performs detailed determination using the Crossing Number method or the Winding Number method. In this case, the determination device 20 determines whether or not the coordinate to be determined is located inside the polygon for inside/outside determination using the polygon indicated in the reduced polygon information D11 as the polygon for inside/outside determination (step S23).

In a case where the determination device 20 determines that the coordinate to be determined is not located inside the polygon for inside/outside determination (step S23: No), the processing proceeds to step S22, and the determination device 20 determines that this coordinate is located outside the polygon for inside/outside determination ("false") (step S22).

In contrast, in a case where the determination device 20 determines that the coordinate to be determined is located inside the polygon for inside/outside determination (step S23: Yes), the determination device 20 determines that this coordinate is located inside the polygon for inside/outside determination ("true") (step S24).

The determination device 20 executes processing from step S21 to step S24 for each coordinate to be determined and transmits determination information associated with a determination result to the inside/outside determination control device 3 for each coordinate to be determined.

[Effects of first embodiment] In this manner, in the first embodiment, the preprocessing of reducing the vertexes of the polygon for inside/outside determination is performed, and polygon inside/outside determination processing is performed on each coordinate using the polygon whose vertexes are reduced. Thus, in the first embodiment, detailed determination is executed on the basis of the polygon whose vertexes are reduced upon detailed determination processing, so that it is possible to shorten processing time of the detailed determination processing compared to a case where detailed determination is performed on the original polygon for inside/outside determination.

Particularly, in a case where the first embodiment is applied to determination as to whether a geographical coordinate of an automobile, or the like, is included in a polygon which expresses a road area, detailed determination processing is performed after vertexes of the polygon which has a number of vertexes and which expresses the road area are reduced in advance, so that it is possible to shorten processing time of the determination processing.

Note that in the first embodiment, the inside/outside determination control device 3 may cause the vertex reduction device 10 to reduce vertexes of the polygon for inside/outside determination in advance, store the polygon in a storage region of the inside/outside determination control device 3, read out the polygon upon inside/outside determination and transmit the polygon to the determination device 20.

[Second embodiment] A second embodiment will be described next. In the second embodiment, processing time required for inside/outside determination processing is shortened by rotating the polygon for inside/outside determination and the coordinate to be determined before the inside/outside determination processing by the determination device and reducing a region of the MBR including the rotated polygon.

Figure 10:
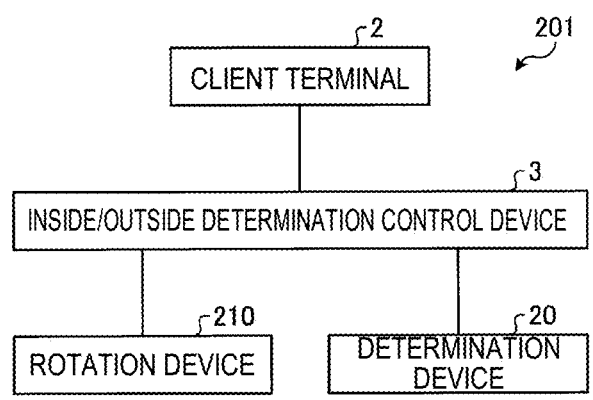
FIG. 10 is a block diagram illustrating an example of a configuration of a determination system according to a second embodiment.

FIG. 10 is a block diagram illustrating an example of a configuration of a determination system according to the second embodiment. As illustrated in FIG. 10, a determination system 201 according to the second embodiment includes a rotation device 210 (a preprocessing device, a first preprocessing device) in place of the vertex reduction device 10 compared to the determination system 1 illustrated in FIG. 1.

The rotation device 210 receives the polygon information D10 and the coordinate information D20 from the inside/outside determination control device 3 and executes preprocessing of rotating the polygon for inside/outside determination and the coordinate to be determined. The rotation device 210 outputs rotated polygon information D12 which is coordinate information of respective vertexes of the rotated polygon and rotated coordinate information D22 which is coordinate information of the rotated coordinate to be determined, to the inside/outside determination control device 3.

The determination device 20 performs inside/outside determination processing of determining whether the rotated coordinate to be determined exists inside or outside the rotated polygon for inside/outside determination on the basis of the rotated polygon information D12 and the rotated coordinate information D22.

Figure 11:
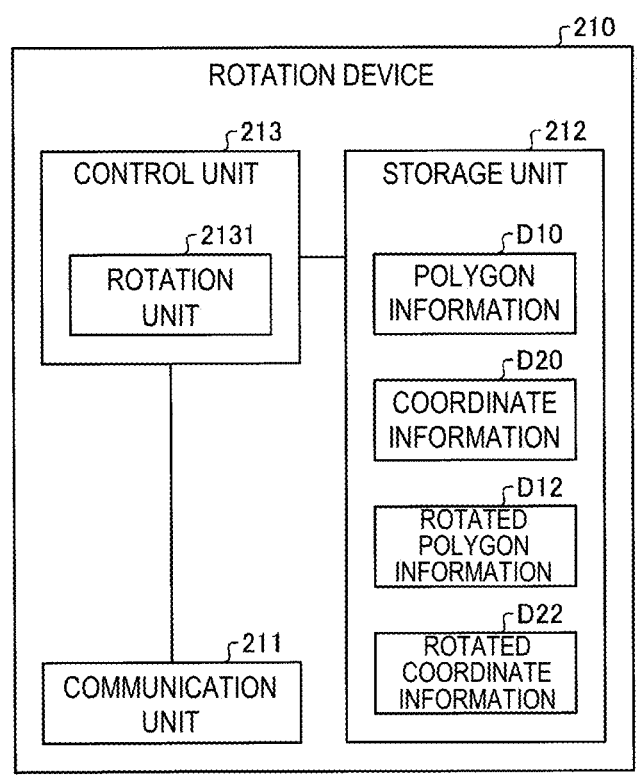
FIG. 11 is a block diagram illustrating an example of a configuration of a rotation device illustrated in FIG. 10.

[Rotation device] The rotation device 210 illustrated in FIG. 10 will be described next. FIG. 11 is a block diagram illustrating an example of a configuration of the rotation device 210 illustrated in FIG. 10. As illustrated in FIG. 11, the rotation device 210 includes a communication unit 211 (an output unit, a first output unit), a storage unit 212, and a control unit 213.

The communication unit 211 has functions similar to the functions of the communication unit 11 in the vertex reduction device 10. The communication unit 211 receives the polygon information D10 and the coordinate information D20 from the inside/outside determination control device 3 via a network. Further, the communication unit 211 transmits the rotated polygon information D12 and the rotated coordinate information D22 generated through the rotation processing performed by a rotation unit 2131 (which will be described later) on the polygon for inside/outside determination and the coordinate to be determined, to the inside/outside determination control device 3.

The storage unit 212 has functions similar to the functions of the storage unit 12 in the vertex reduction device 10. The storage unit 312 stores the polygon information D10, the coordinate information D20, the rotated polygon information D12 and the rotated coordinate information D22.

The control unit 213 has functions similar to the functions of the control unit 13 in the vertex reduction device 10. The control unit 213 includes the rotation unit 2131.

The rotation unit 2131 acquires the polygon information D10 and the coordinate information D20 and rotates the polygon for inside/outside determination and the coordinate to be determined as preprocessing of inside/outside determination processing. For example, the rotation unit 2131 implements rotation processing using algorithm for deriving a rotation angle (see, for example, Reference Literature 2), or the like.

Reference Literature 2: "Minimum-Area Rectangle Containing a Set of Points", online, Accessed Aug. 23, 2019, Retrieved from: https://www.geometrictools.com/Documentation/MinimumAreaRectangle.pdf The rotation unit 2131 stores the rotated polygon information D12 and the rotated coordinate information D22 in the storage unit 212 and outputs the rotated polygon information D12 and the rotated coordinate information D22 to the inside/outside determination control device 3 via the communication unit 211.

Figure 12:
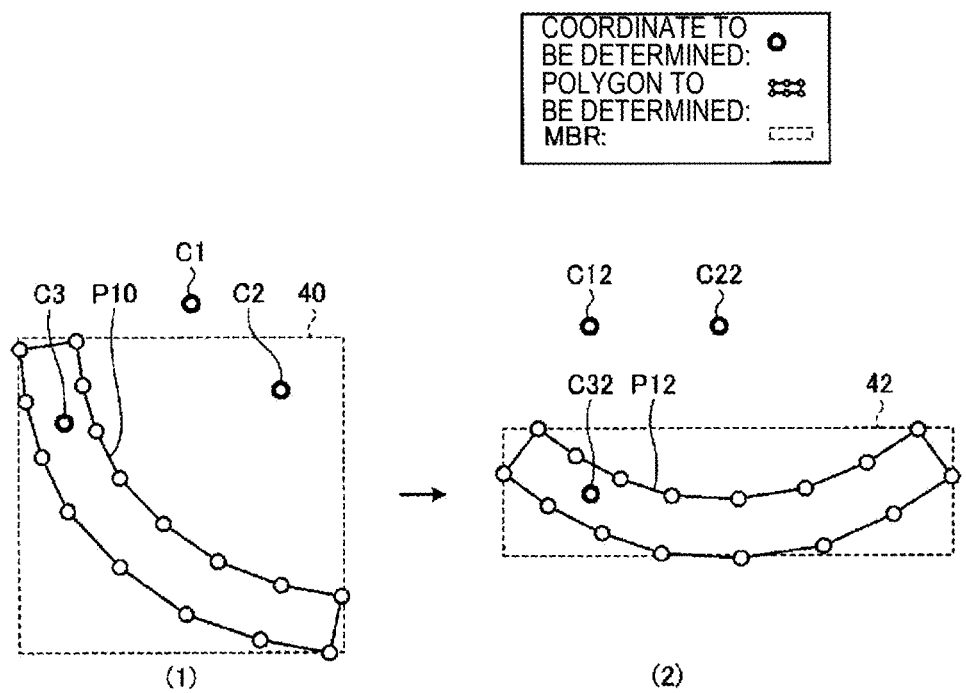
FIG. 12 is a view for explaining rotation processing.

[Rotation processing] Rotation processing to be executed by the rotation device 210 will be specifically described next. FIG. 12 is a view for explaining the rotation processing. (1) of FIG. 12 indicates the polygon P10 for inside/outside determination and the coordinates C1, C2 and C3 to be determined before the rotation processing, and (2) of FIG. 12 indicates the polygon P11 after the rotation processing and rotated coordinates C12, C22 and C32. Further, FIG. 12 also indicates the MBR 40 before the rotation processing and an MBR 42 set after the rotation processing for explanation.

As illustrated in (1) of FIG. 12, the MBR 40 for the polygon P10 has a substantially square shape including the coordinates C1 and C2. The rotation unit 2131 of the rotation device 210 rotates the polygon P10 and the coordinates C1, C2 and C3 to be determined as appropriate using the algorithm for deriving a rotation angle.

Through this processing, as illustrated in (2) of FIG. 12, the MBR 42 whose area is reduced compared to the MBR 40 can be set as the MBR including the rotated polygon P12 for inside/outside determination. Further, the coordinate C22 to be determined is located outside the new MBR 42 through rotation, and thus, determination on the coordinate C22 to be determined is finished after only simple determination is performed.

As a result of this, simple determination is performed using the MBR 42 whose area is reduced in the determination processing by the determination device 20, and thus, more coordinates can be determined as being located outside the polygon for inside/outside determination only through simple determination, so that it is possible to reduce the number of times of execution of detailed determination. In the example in FIG. 12, only the coordinate C32 among the coordinates C12, C22 and C23 is to be subjected to detailed determination.

[Processing Procedure of Determination Processing]

Figure 13:
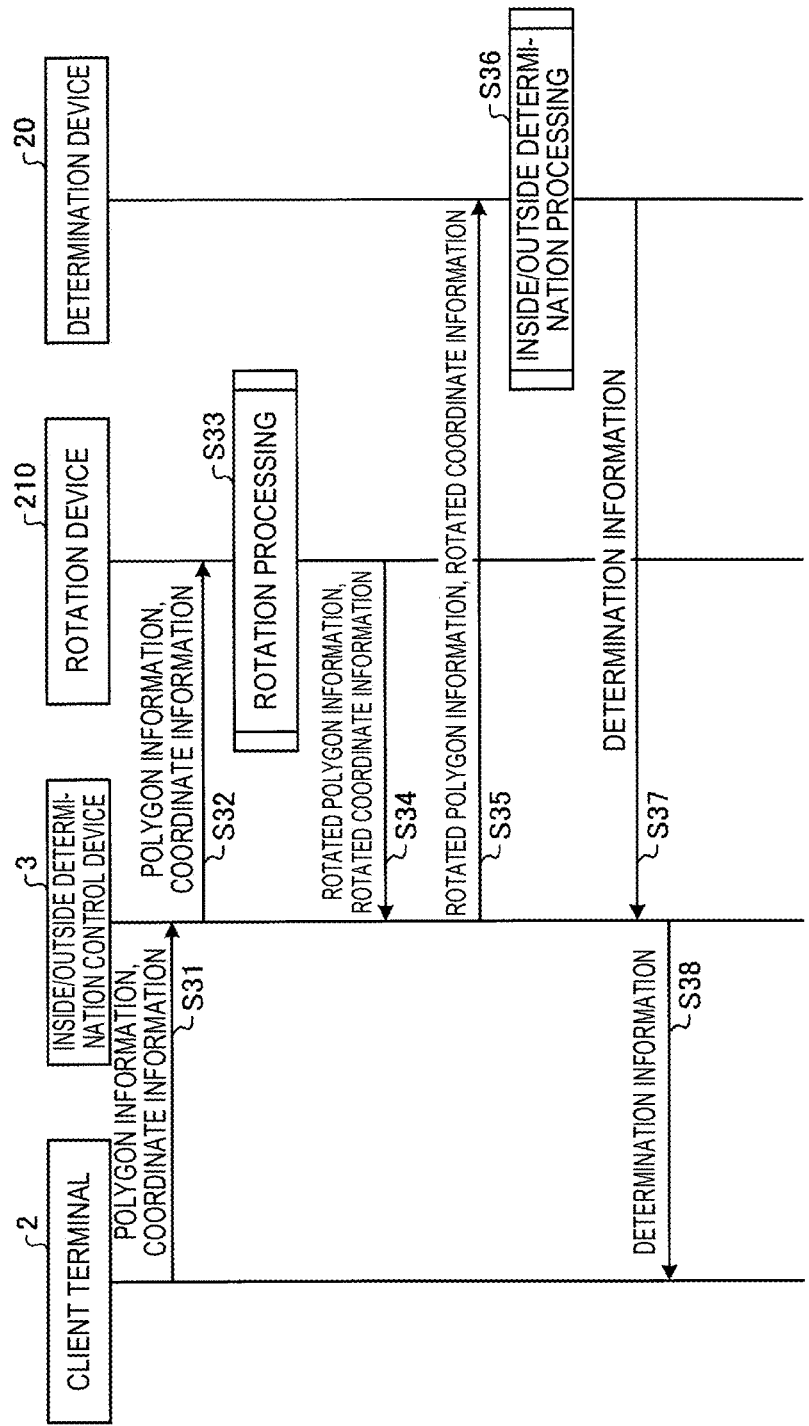
FIG. 13 is a sequence diagram for explaining processing procedure of determination processing by the determination system illustrated in FIG. 10.

Processing procedure of the determination processing in the determination system 201 will be described next. FIG. 13 is a sequence diagram for explaining the processing procedure of the determination processing by the determination system 201 illustrated in FIG. 10.

Processing in step S31 illustrated in FIG. 13 is the same processing as the processing in step S1 illustrated in FIG. 7. When the inside/outside determination control device 3 receives a request for determination, the inside/outside determination control device 3 transmits the polygon information D10 and the coordinate information D20 to the rotation device 210 (step S32) and causes the rotation device 210 to execute preprocessing.

The rotation device 210 executes rotation processing of rotating the polygon for inside/outside determination and the coordinate to be determined on the basis of the polygon information D10 and the coordinate information D20 received from the inside/outside determination control device 3 as the preprocessing (step S33). The rotation device 210 transmits rotated polygon information D12 and rotated coordinate information D22 to the inside/outside determination control device 3 (step S34).

The inside/outside determination control device 3 transmits the rotated polygon information D12 and the rotated coordinate information D22 to the determination device 20 (step S35) and causes the determination device 20 to execute inside/outside determination processing. The determination device 20 performs inside/outside determination processing of determining whether the rotated coordinate to be determined exists inside or outside the rotated polygon for inside/outside determination on the basis of the rotated polygon information D12 and the rotated coordinate information D22 (step S36). Note that the inside/outside determination processing is the same processing as the processing in step S6 illustrated in FIG. 7. Further, processing in step S37 and S38 illustrated in FIG. 13 is the same processing as the processing in step S7 and S8 illustrated in FIG. 7.

Figure 14:
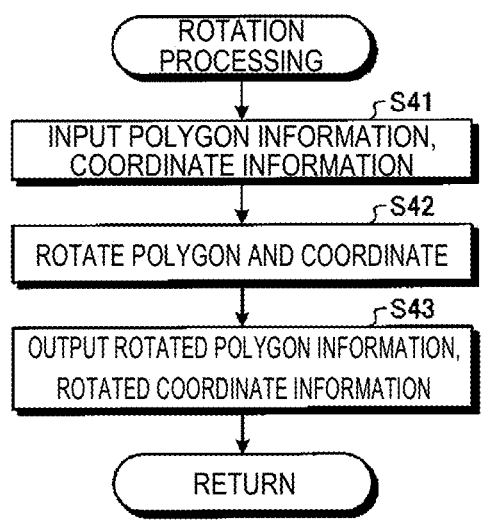
FIG. 14 is a flowchart illustrating processing procedure of the rotation processing illustrated in FIG. 13.

[Processing procedure of rotation processing] Processing procedure of the rotation processing (step S33) will be described next. FIG. 14 is a flowchart illustrating the processing procedure of the rotation processing illustrated in FIG. 13.

As illustrated in FIG. 14, when the rotation device 210 receives input of the polygon information D10 and the coordinate information D20 from the inside/outside determination control device 3 (step S41), the rotation device 210 rotates the polygon for inside/outside determination and the coordinate to be determined (step S42). The rotation device 210 generates the rotated polygon information D12 and the rotated coordinate information D22, outputs the rotated polygon information D12 and the rotated coordinate information D22 to the inside/outside determination control device 3 (step S43) and finishes the rotation processing.

[Effects of second embodiment] In this manner, in the second embodiment, preprocessing of rotating the polygon for inside/outside determination and the coordinate to be determined is performed, and polygon inside/outside determination processing is performed on each rotated coordinate to be determined using the MBR whose area is reduced compared to the MBR before the rotation. Thus, in the second embodiment, simple determination is performed using the MBR whose area is reduced, so that more coordinates can be determined as being located outside the polygon for inside/outside determination only through the simple determination. It is therefore possible to reduce the number of times of execution of detailed determination, so that it is possible to shorten the whole processing time of the determination processing in the second embodiment.

Note that in the second embodiment, the inside/outside determination control device 3 may cause the rotation device 210 to rotate the polygon for inside/outside determination and the coordinate to be determined in advance, store the rotated polygon for inside/outside determination and the rotated coordinate to be determined in a storage region of the inside/outside determination control device 3, read out the rotated polygon for inside/outside determination and the rotated coordinate to be determined and transmit the rotated polygon for inside/outside determination and the rotated coordinate to be determined to the determination device 20 upon inside/outside determination.

[Third embodiment] A third embodiment will be described next. The third embodiment reduces processing time required for inside/outside determination processing by dividing the polygon for inside/outside determination into a plurality of polygons having small areas before the inside/outside determination processing by the determination device to reduce areas of respective MBRs for the divided polygons.

Figure 15:
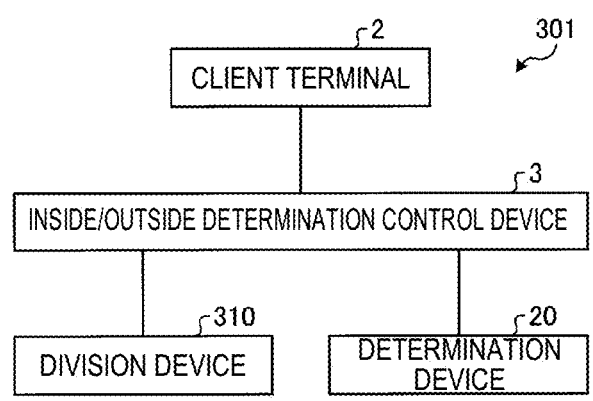
FIG. 15 is a block diagram illustrating an example of a configuration of a determination system according to a third embodiment.

FIG. 15 is a block diagram illustrating an example of a configuration of a determination system according to the third embodiment. As illustrated in FIG. 15, a determination system 301 according to the third embodiment includes a division device 310 (second preprocessing apparatus) in place of the vertex reduction device 10 compared to the determination system 1 illustrated in FIG. 1.

The division device 310 receives the polygon information D10 from the inside/outside determination control device 3 and executes preprocessing of dividing the polygon for inside/outside determination. The division device 310 divides the polygon for inside/outside determination and outputs divided polygon information D13 including coordinate information of respective vertexes of the respective divided polygons, to the inside/outside determination control device 3.

The determination device 20 performs inside/outside determination processing of determining whether the coordinate to be determined exists inside or outside the polygon for inside/outside determination for each of the divided polygons for inside/outside determination on the basis of the divided polygon information D13 and the coordinate information D20.

Figure 16:
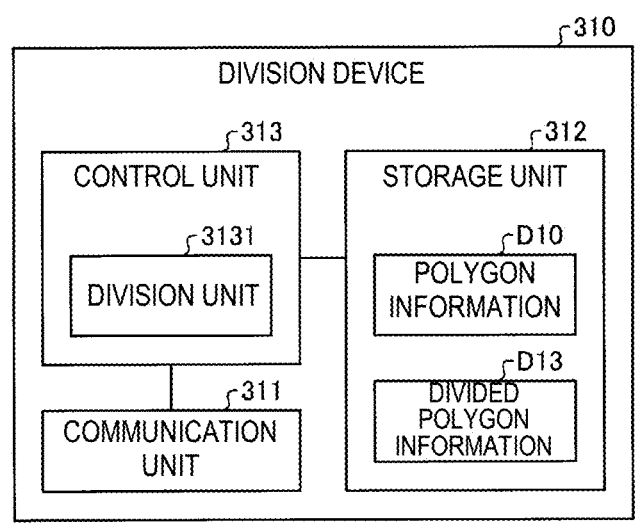
FIG. 16 is a block diagram illustrating an example of a configuration of a division device illustrated in FIG. 15.

[Division device] The division device 310 illustrated in FIG. 15 will be described next. FIG. 16 is a block diagram illustrating an example of a configuration of the division device 310 illustrated in FIG. 15. As illustrated in FIG. 16, the division device 310 includes a communication unit 311 (second output unit), a storage unit 312, and a control unit 313.

The communication unit 311 has functions similar to the functions of the communication unit 11 in the vertex reduction device 10. The communication unit 311 receives the polygon information D10 from the inside/outside determination control device 3 via a network. Further, the communication unit 311 transmits divided polygon information D13 generated through division processing performed by a division unit 3131 (which will be described later) on the polygon for inside/outside determination, to the inside/outside determination control device 3.

The storage unit 312 has functions similar to the functions of the storage unit 12 in the vertex reduction device 10. The storage unit stores the polygon information D10 and the divided polygon information D13.

The control unit 313 has functions similar to the functions of the control unit 13 in the vertex reduction device 10. The control unit 313 includes the division unit 3131.

The division unit 3131 acquires the polygon information D10 and divides the polygon for inside/outside determination into a plurality of polygons as preprocessing of the inside/outside determination processing. For example, the division unit 3131 implements division processing using polygon triangulation algorithm (see, for example, Reference Literature 3).

Reference Literature 3: "Polygon triangulation inO(n log log n) time with simple data structures", online, Accessed Aug. 23, 2019, Retrieved from: https://link.springer.com/article/10.1007%2FBF02187846

The division unit 3131 stores the divided polygon information D13 which is coordinate information of respective vertexes of respective polygons divided through division processing on the polygon for inside/outside determination in the storage unit 312 and outputs the divided polygon information D13 to the inside/outside determination control device 3 via the communication unit 211.

Figure 17:
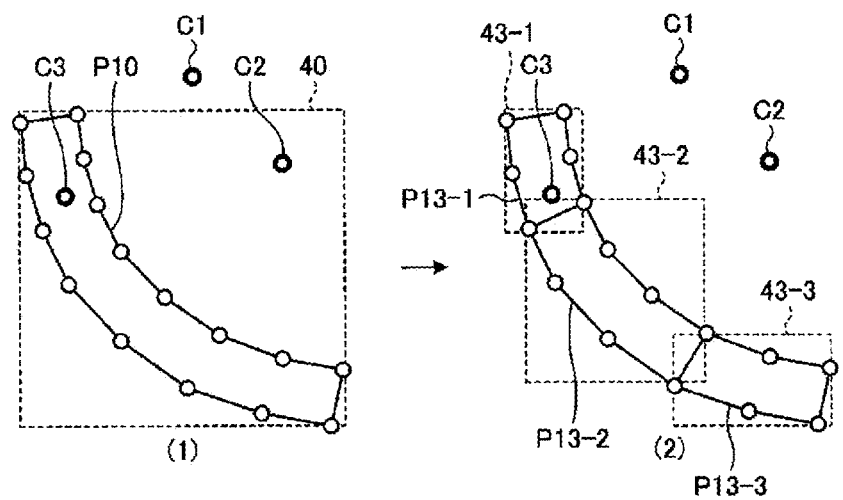
FIG. 17 is a view for explaining division processing.

[Division processing] Division processing to be executed by the division device 310 will be specifically described next. FIG. 17 is a view for explaining the division processing. (1) of FIG. 17 indicates the polygon P10 for inside/outside determination before the division processing and the coordinates C1, C2 and C3 to be determined, and (2) of FIG. 17 indicates polygons P13-1, P13-2 and P13-3 after the division processing. Further, FIG. 17 also indicates the MBR 40, MBRs 43-1, 43-2 and 43-3 respectively for the divided polygons P13-1, P13-2 and P13-3 and the coordinates C1, C2 and C3 to be determined for explanation.

As illustrated in (1) of FIG. 17, the MBR 40 for the polygon P10 has a substantially square shape including the coordinates C1 and C2. The division unit 3131 of the division device 310 divides the polygon P10 into, for example, three polygons P13-1, P13-2 and P13-3 (see (2) of FIG. 17) using the polygon triangulation algorithm.

Through this processing, the MBRs 43-1, 43-2 and 43-3 can be set as MBRs respectively including the divided polygons P13-1, P13-2 and P13-3 for inside/outside determination as illustrated in (2) of FIG. 17. As illustrated in (2) of FIG. 17, areas of these MBRs 43-1, 43-2 and 43-3 are reduced compared to the area of the MBR 40. Further, as illustrated in (2) of FIG. 17, the coordinate C2 to be determined located inside the MBR 40 is located outside the new MBRs 43-1, 43-2 and 43-3, and thus, determination on the coordinate C2 to be determined is finished after only simple determination is performed.

As a result, simple determination is performed using the MBRs 43-1, 43-2 and 43-3 whose areas are reduced in the determination processing by the determination device 20, and thus, more coordinates can be determined as being located outside the polygon for inside/outside determination only through the simple determination, so that it is possible to reduce the number of times of execution of detailed determination. In the example in FIG. 17, only the coordinate C3 among the coordinates C1, C2 and C3 is to be subjected to detailed determination.

[Processing Procedure of Determination Processing]

Figure 18:
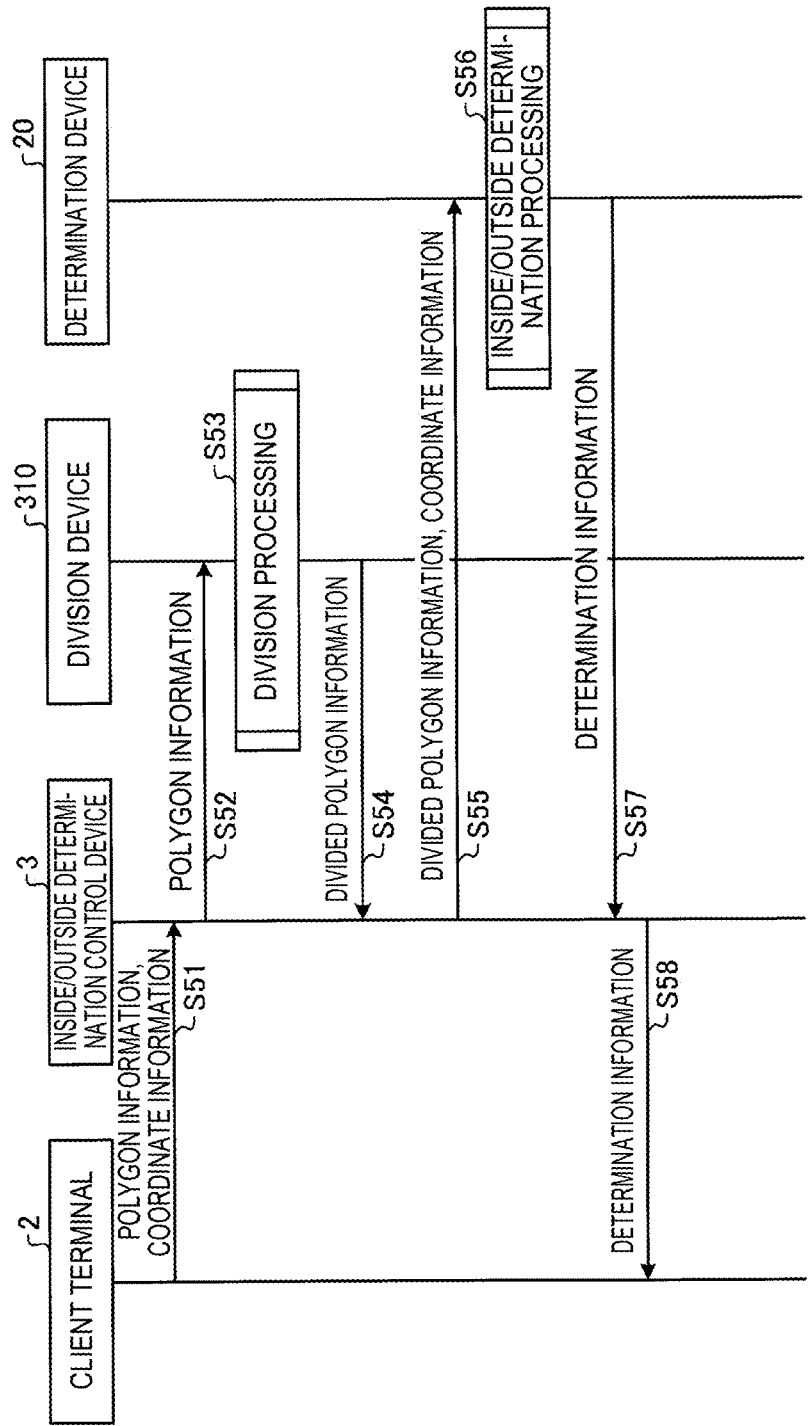
FIG. 18 is a sequence diagram for explaining processing procedure of determination processing by the determination system illustrated in FIG. 15.

Processing procedure of determination processing in the determination system 301 will be described next. FIG. 18 is a sequence diagram for explaining the processing procedure of the determination processing by the determination system 301 illustrated in FIG. 15.

Processing in step S51 illustrated in FIG. 18 is the same processing as the processing in step S1 illustrated in FIG. 7. When the inside/outside determination control device 3 receives a request for determination, the inside/outside determination control device 3 transmits the polygon information D10 to the division device 310 (step S52) and causes the division device 310 to execute preprocessing.

The division device 310 executes division processing of dividing the polygon for inside/outside determination into a plurality of polygons on the basis of the polygon information D10 received from the inside/outside determination control device 3 as the preprocessing (step S53). The division device 310 transmits divided polygon information D13 to the inside/outside determination control device 3 (step S54).

The inside/outside determination control device 3 transmits the divided polygon information D13 and the coordinate information D20 to the determination device 20 (step S55) and causes the determination device 20 to execute inside/outside determination processing. The determination device 20 performs inside/outside determination processing of determining whether the coordinate to be determined exists inside or outside the divided polygons for inside/outside determination for each of the divided polygons for inside/outside determination on the basis of the divided polygon information D13 and the coordinate information D20 (step S56). Note that the inside/outside determination processing is the same processing as the processing in step S6 illustrated in FIG. 7. Further, processing in step S57 and S58 illustrated in FIG. 17 is the same processing as the processing in step S7 and S8 illustrated in FIG. 7.

Figure 19:
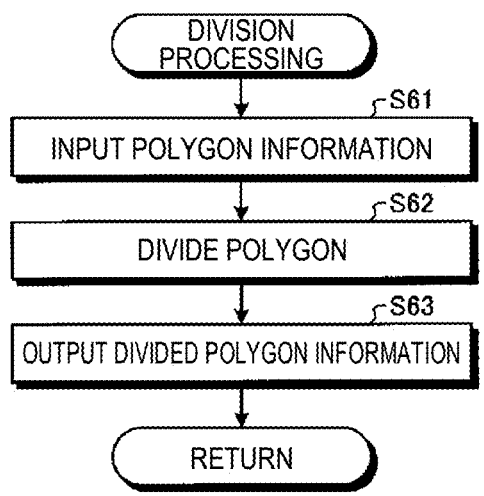
FIG. 19 is a flowchart illustrating processing procedure of the division processing illustrated in FIG. 18.

[Processing procedure of division processing] Processing procedure of the division processing (step S53) will be described next. FIG. 19 is a flowchart illustrating the processing procedure of the division processing illustrated in FIG. 18.

As illustrated in FIG. 14, when the rotation device 210 receives input of the polygon information D10 from the inside/outside determination control device 3 (step S61), the division device 310 divides the polygon for inside/outside determination into a plurality of polygons (step S62). The division device 310 generates the divided polygon information D13, outputs the divided polygon information D13 to the inside/outside determination control device 3 (step S63) and finishes the rotation processing.

[Effects of third embodiment] In this manner, in the third embodiment, preprocessing of dividing the polygon for inside/outside determination into a plurality of polygons is performed, and polygon inside/outside determination processing is performed on respective coordinates to be determined using a plurality of MBRs whose areas are reduced as a whole compared to the MBR for the polygon before division. Thus, in the third embodiment, simple determination is performed using a plurality of MBRs whose areas are reduced as a whole, and thus, more coordinates can be determined as being located outside the polygon for inside/outside determination only through the simple determination. By this means, in the third embodiment, the number of times of execution of detailed determination can be reduced, so that it is possible to shorten the whole processing time for determination processing.

Note that in the third embodiment, the inside/outside determination control device 3 may cause the division device 310 to divide the polygon for inside/outside determination into a plurality of polygons in advance, store the plurality of divided polygons in the storage region of the inside/outside determination control device 3, and read out and transmit the plurality of divided polygons to the determination device 20 upon inside/outside determination.

[Fourth embodiment] A fourth embodiment will be described next. The fourth embodiment further shortens processing time required for inside/outside determination processing by sequentially executing the preprocessing described in the first to the third embodiments.

Figure 20:
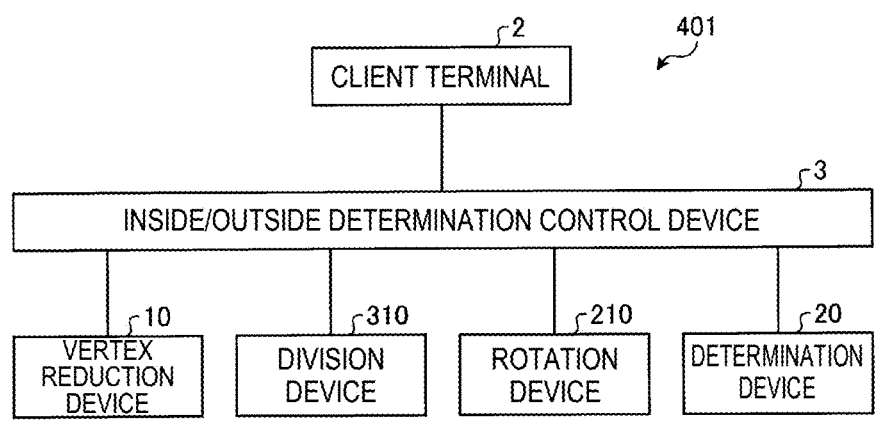
FIG. 20 is a block diagram illustrating an example of a configuration of a determination system according to a fourth embodiment.

FIG. 20 is a block diagram illustrating an example of a configuration of a determination system according to the fourth embodiment. As illustrated in FIG. 20, a determination system 401 according to the fourth embodiment includes the vertex reduction device 10, the division device 310 and the rotation device 210 as preprocessing devices.

The inside/outside determination control device 3, for example, first, transmits the polygon information D10 to the vertex reduction device 10 and causes the vertex reduction device 10 to execute the vertex reduction processing as first preprocessing to thereby acquire reduced polygon information D11.

Then, the inside/outside determination control device 3 transmits the reduced polygon information D11 to the division device 310 and causes the division device 310 to execute the division processing as second preprocessing. The inside/outside determination control device 3 thereby acquires vertex-reduced divided polygon information D13' for polygons which are divided after vertexes are reduced.

Subsequently, the inside/outside determination control device 3 transmits the vertex-reduced divided polygon information D13' and the coordinate information D20 to the rotation device 210 and causes the rotation device 210 to execute the rotation processing as third preprocessing. The inside/outside determination control device 3 thereby acquires vertex-reduced divided rotated polygon information D12' for polygons for inside/outside determination which are rotated after the vertexes are reduced and divided, and the rotated coordinate information D22.

The determination device 20 performs inside/outside determination processing of determining whether the coordinate to be determined exists inside or outside the polygon for inside/outside determination for each of the divided and rotated polygons for inside/outside determination on the basis of the vertex-reduced divided rotated polygon information D12' and the rotated coordinate information D22.

[Processing Procedure of Determination Processing]

Figure 21:
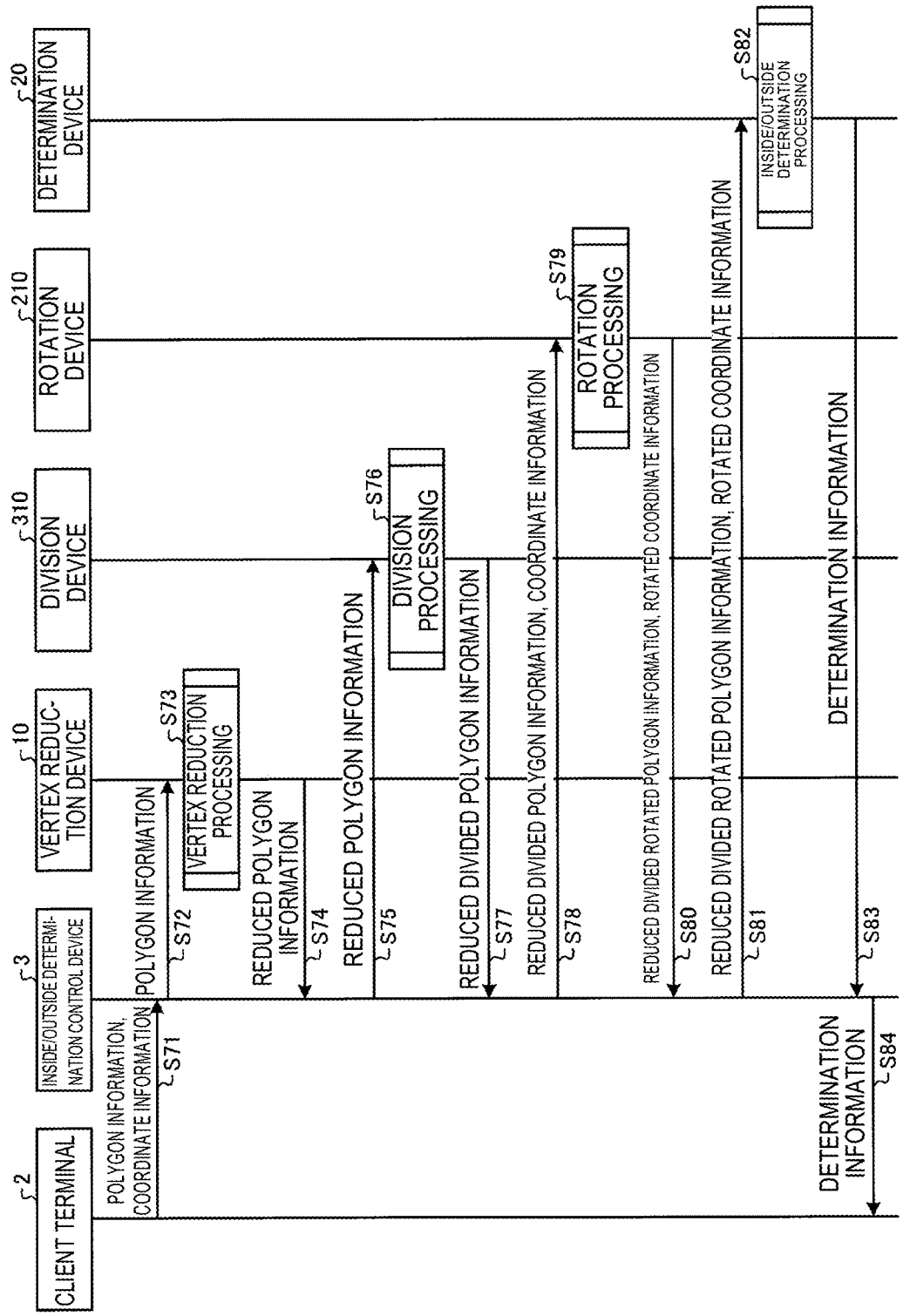
FIG. 21 is a sequence diagram for explaining processing procedure of determination processing by the determination system illustrated in FIG. 20.

Processing procedure of determination processing in the determination system 401 will be described next. FIG. 21 is a sequence diagram for explaining the processing procedure of the determination processing by the determination system 401 illustrated in FIG. 20.

Processing from step S71 to step S74 illustrated in FIG. 20 is the same processing as the processing from step S1 to step S4 illustrated in FIG. 7. The inside/outside determination control device 3 transmits the reduced polygon information D11 to the division device 310 (step S75) and causes the division device 310 to execute preprocessing.

The division device 310 executes division processing of dividing the polygon whose vertexes are reduced into a plurality of polygons as the preprocessing (step S76). The division device 310 transmits vertex-reduced divided polygon information D13' to the inside/outside determination control device 3 (step S77). The processing in step S76 is the same processing as the processing in step S53 illustrated in FIG. 18.

The inside/outside determination control device 3 then transmits the vertex-reduced divided polygon information D13' and the coordinate information D20 to the rotation device 210 (step S78) and causes the rotation device 210 to execute preprocessing. The rotation device 210 executes rotation processing of rotating the respective polygons for inside/outside determination and the coordinate to be determined on the basis of the vertex-reduced divided polygon information D13' and the coordinate information D20 received from the inside/outside determination control device 3 as the preprocessing (step S79). The rotation device 210 transmits the vertex-reduced divided rotated polygon information D12' and the rotated coordinate information D22 to the inside/outside determination control device 3

(step S80). The processing in step S79 is the same processing as the processing in step S33 illustrated in FIG. 13.

The inside/outside determination control device 3 transmits the vertex-reduced divided rotated polygon information D12' and the rotated coordinate information D22 to the determination device 20 (step S81) and causes the determination device 20 to execute inside/outside determination processing. The determination device 20 performs inside/outside determination processing of determining whether the coordinate to be determined exists inside or outside the polygon for inside/outside determination for each of the divided and rotated polygons for inside/outside determination on the basis of the vertex-reduced divided rotated polygon information D12' and the rotated coordinate information D22 (step S82). Note that the inside/outside determination processing is the same processing as the processing in step S6 illustrated in FIG. 7. Further, processing in step S83 and S84 illustrated in FIG. 21 is the same processing as the processing in step S7 and S8 illustrated in FIG. 7.

[Effects of fourth embodiment] In this manner, in the fourth embodiment, the vertex reduction processing on the polygon for inside/outside determination, the rotation processing on the polygon for inside/outside determination after vertexes are reduced, and the division processing on the polygon for inside/outside determination after vertexes are reduced and after the polygon is divided are sequentially executed as the preprocessing. By this means, in the fourth embodiment, more coordinates can be expected to be determined as being located outside the polygon for inside/outside determination only through simple determination, so that it is possible to further shorten processing time required for inside/outside determination processing compared to the first to the third embodiments.

Note that while a case has been described as an example in the fourth embodiment where the vertex reduction processing on the polygon for inside/outside determination, the rotation processing on the polygon for inside/outside determination after vertexes are reduced, and the division processing on the polygon for inside/outside determination after vertexes are reduced and after the polygon is divided are sequentially performed in this order as the preprocessing, the order of the preprocessing is not limited to this order.

[Modified example 1 of fourth embodiment] Further, while a case has been described as an example in the fourth embodiment where the vertex reduction device 10, the division device 310 and the rotation device 210 are provided as the preprocessing devices, the preprocessing devices are not limited to these devices. The preprocessing devices may be two devices of the vertex reduction device 10 and the rotation device 210. Processing procedure of the determination processing in this case will be described.

Figure 22:
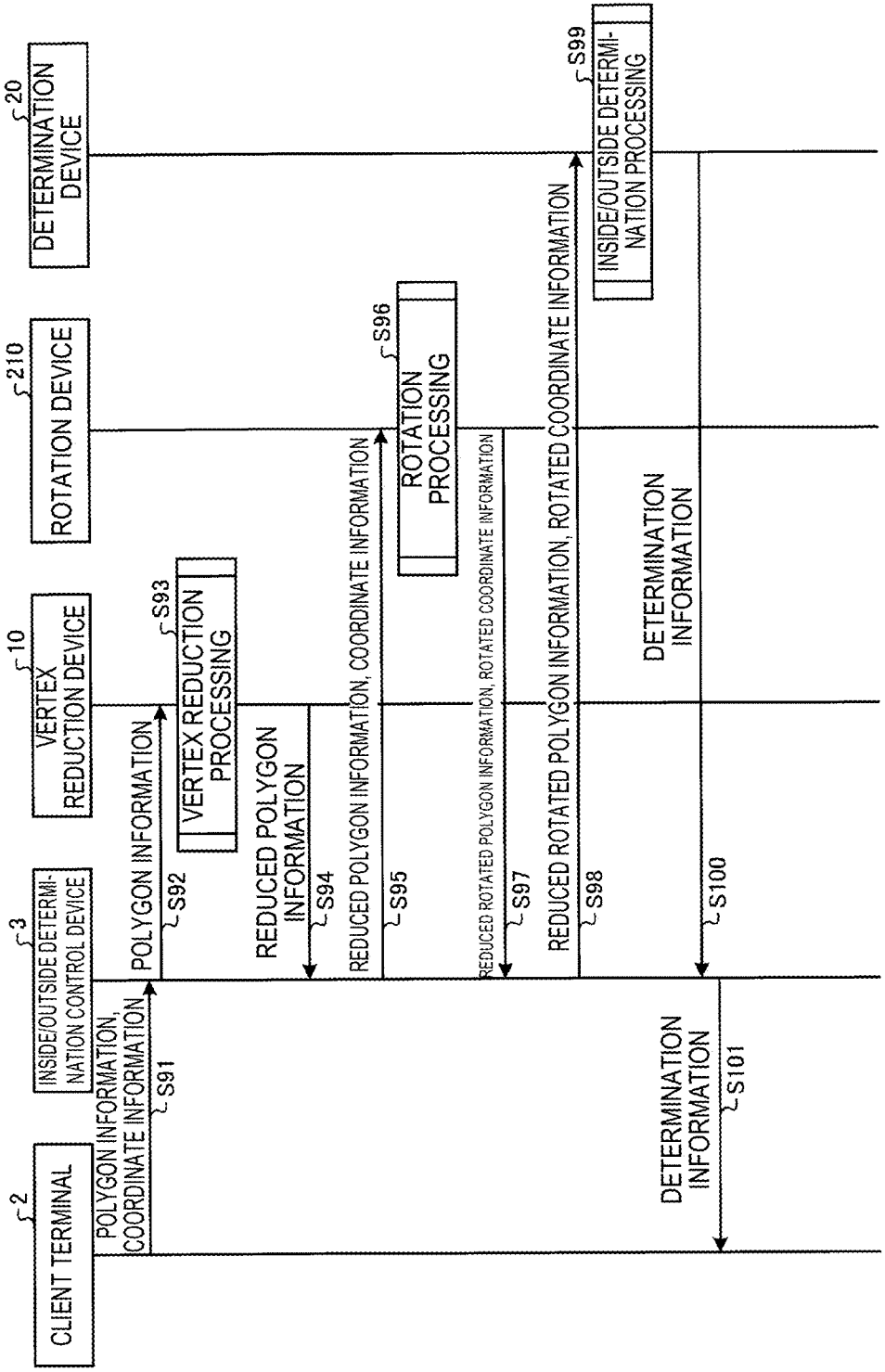
FIG. 22 is a sequence diagram for explaining processing procedure of determination processing in modified example 1 of the fourth embodiment.

FIG. 22 is a sequence diagram for explaining the processing procedure of the determination processing in modified example 1 of the fourth embodiment. Processing from step S91 to step S94 illustrated in FIG. 22 is the same processing as the processing from step S1 to step S4 illustrated in FIG. 7. The inside/outside determination control device 3 transmits the reduced polygon information D11 and the coordinate information D20 to the rotation device 210 (step S95) and causes the rotation device 210 to execute preprocessing.

The rotation device 210 executes rotation processing of rotating the polygon for inside/outside determination after vertexes are reduced and the coordinate to be determined on the basis of the reduced polygon information D11 and the coordinate information D20 received from the inside/outside determination control device 3 as the preprocessing (step S96). The rotation device 210 transmits vertex-reduced rotated polygon information D12" and the rotated coordinate information D22 to the inside/outside determination control device 3 (step S97). The processing in step S96 is the same processing as the processing in step S33 illustrated in FIG. 13.

The inside/outside determination control device 3 transmits the vertex-reduced rotated polygon information D12" and the rotated coordinate information D22 to the determination device 20 (step S98) and causes the determination device 20 to execute inside/outside determination processing. The determination device 20 performs inside/outside determination processing of determining whether the coordinate to be determined exists inside or outside the polygon for inside/outside determination for each polygon for inside/outside determination after vertexes are reduced and after rotation on the basis of the vertex-reduced rotated polygon information D12" and the rotated coordinate information D22 (step S99). Note that the inside/outside determination processing is the same processing as the processing in step S6 illustrated in FIG. 7. Further, processing in step S100 and S101 illustrated in FIG. 21 is the same processing as the processing in step S7 and S8 illustrated in FIG. 7.

[Modified example 2 of fourth embodiment] Further, the preprocessing devices may be two of the vertex reduction device 10 and the division device 310. Processing procedure of determination processing in this case will be described.

Figure 23:
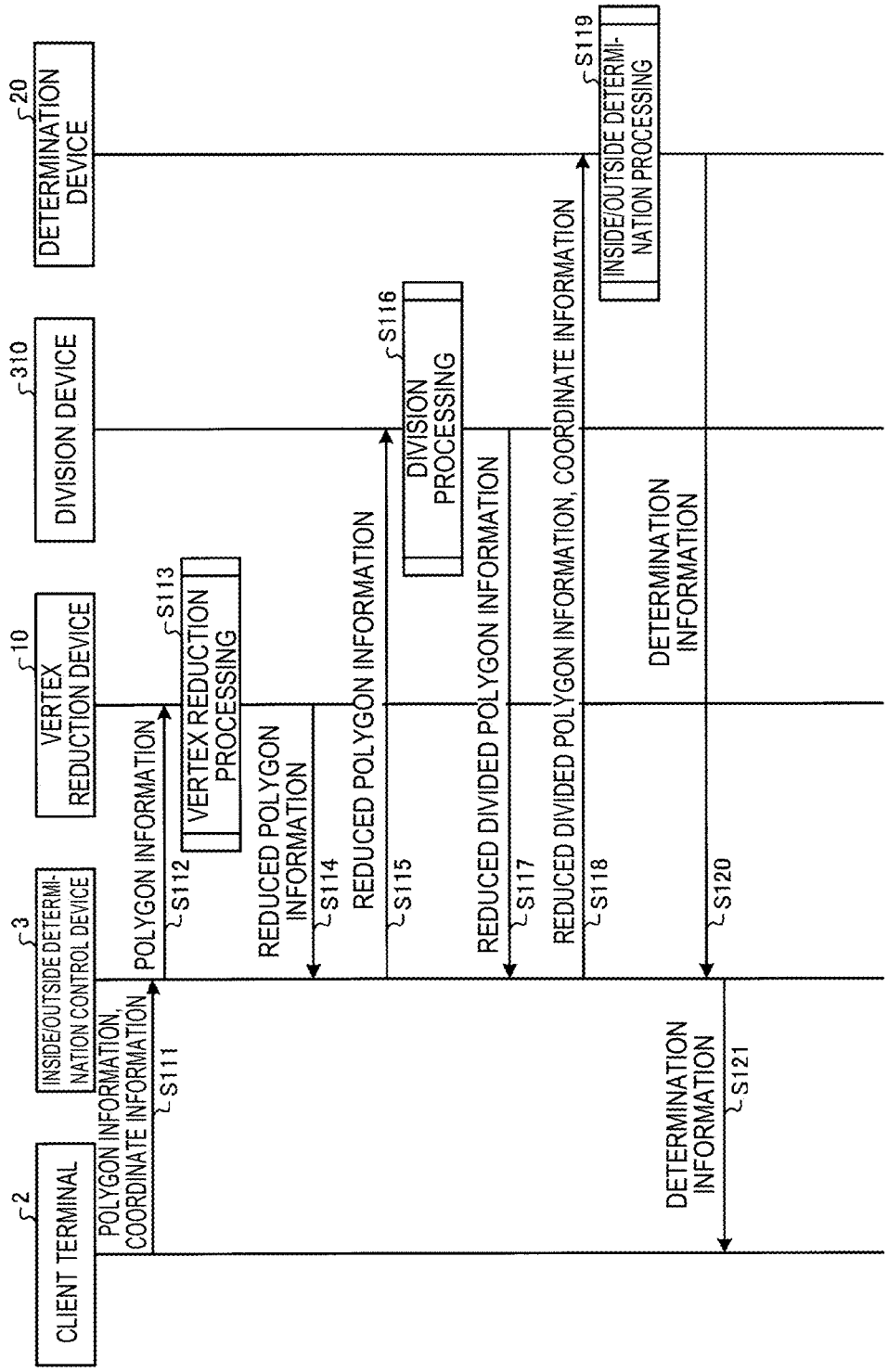
FIG. 23 is a sequence diagram for explaining processing procedure of determination processing in modified example 2 of the fourth embodiment.

FIG. 23 is a sequence diagram for explaining the processing procedure of the determination processing in modified example 2 of the fourth embodiment. Processing from step S111 to step S114 illustrated in FIG. 23 is the same processing as the processing from step S1 to step S4 illustrated in FIG. 7. Processing from step S115 to step S117 illustrated in FIG. 23 is the same processing as the processing from step S75 to step S77 illustrated in FIG. 21. The inside/outside determination control device 3 transmits the vertex-reduced divided polygon information D13' and the coordinate information D20 to the determination device 20 (step S118) and causes the determination device 20 to execute inside/outside determination processing.

The determination device 20 performs inside/outside determination processing of determining whether the coordinate to be determined exists inside or outside the polygon for inside/outside determination for each of the polygons for inside/outside determination after vertexes are reduced and after the polygon is divided on the basis of the vertex-reduced divided polygon information D13' and the coordinate information D20 (step S119). Note that the inside/outside determination processing is the same processing as the processing in step S6 illustrated in FIG. 7. Further, processing in step S120 and S121 illustrated in FIG. 23 is the same processing as the processing in step S7 and S8 illustrated in FIG. 7.

[Modified example 3 of fourth embodiment] Further, the preprocessing devices may be two of the rotation device 210 and the division device 310. Processing procedure of determination processing in this case will be described.

Figure 24:
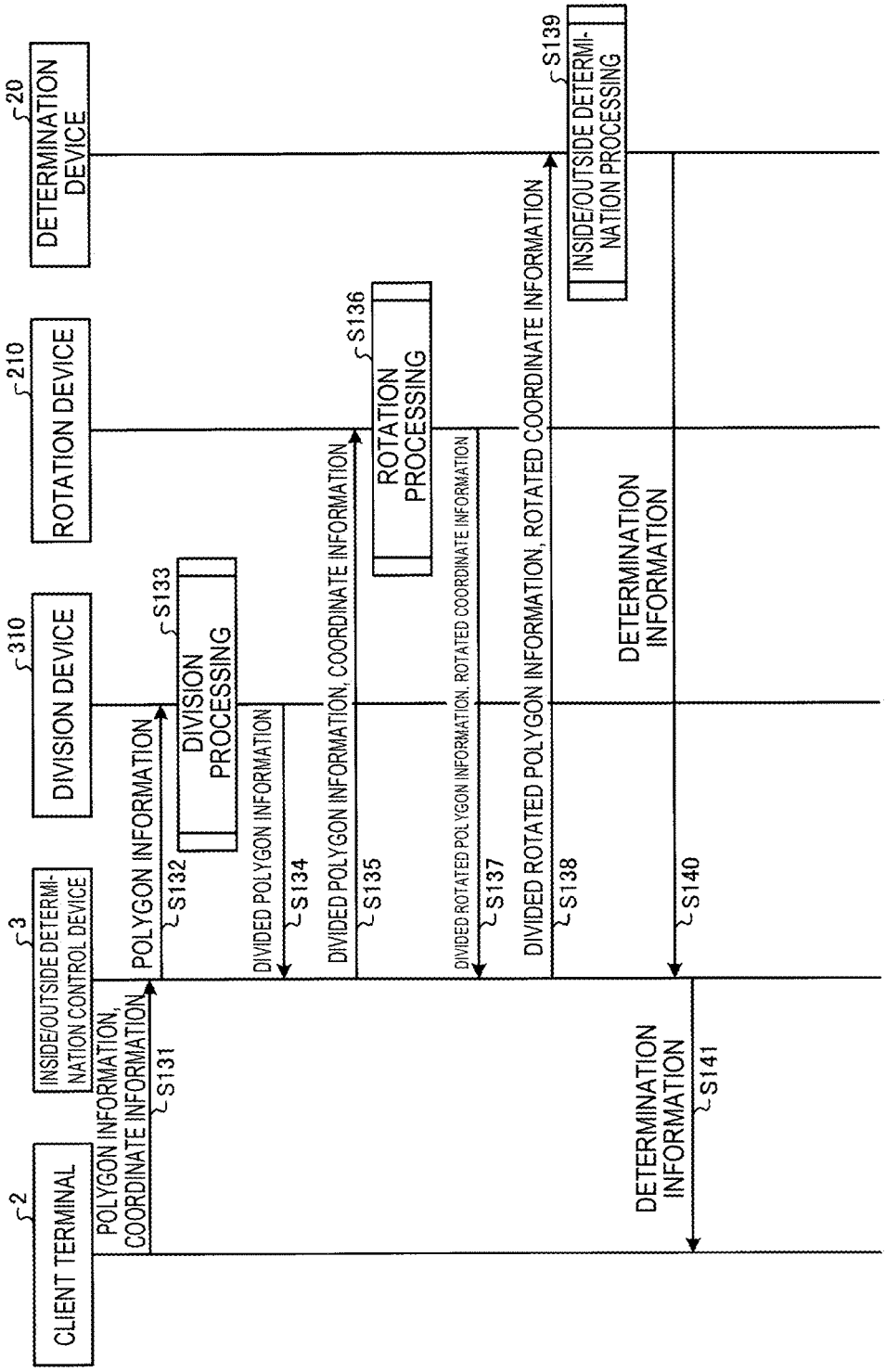
FIG. 24 is a sequence diagram for explaining processing procedure of determination processing in modified example 3 of the fourth embodiment.

FIG. 24 is a sequence diagram for explaining the processing procedure of the determination processing in modified example 3 of the fourth embodiment. Processing from step S131 to step S134 illustrated in FIG. 24 is the same processing as the processing from step S51 to step S54 illustrated in FIG. 18.

The inside/outside determination control device 3 then transmits the divided polygon information D13 and the coordinate information D20 to the rotation device 210 (step S135) and causes the rotation device 210 to execute preprocessing. The rotation device 210 executes rotation processing of rotating the respective polygons for inside/outside determination and the coordinate to be determined on the basis of the divided polygon information D13 and the coordinate information D20 received from the inside/outside determination control device 3 as preprocessing (step S136). The rotation device 210 transmits divided rotated polygon information D13" and the rotated coordinate information D22 to the inside/outside determination control device 3 (step S137). The processing in step S136 is the same as the processing in step S33 illustrated in FIG. 13.

The inside/outside determination control device 3 transmits the divided rotated polygon information D13" and the rotated coordinate information D22 to the determination device 20 (step S138) and causes the determination device 20 to execute inside/outside determination processing. The determination device 20 performs inside/outside determination processing of determining whether the coordinate to be determined exists inside or outside the polygon for inside/outside determination for each of the divided and rotated polygons for inside/outside determination on the basis of the divided rotated polygon information D13" and the rotated coordinate information D22 (step S139). Note that the inside/outside determination processing is the same processing as the processing in step S6 illustrated in FIG. 7. Further, processing in step S140 and S141 illustrated in FIG. 24 is the same processing as the processing in step S7 and S8 illustrated in FIG. 7.

Figure 25:
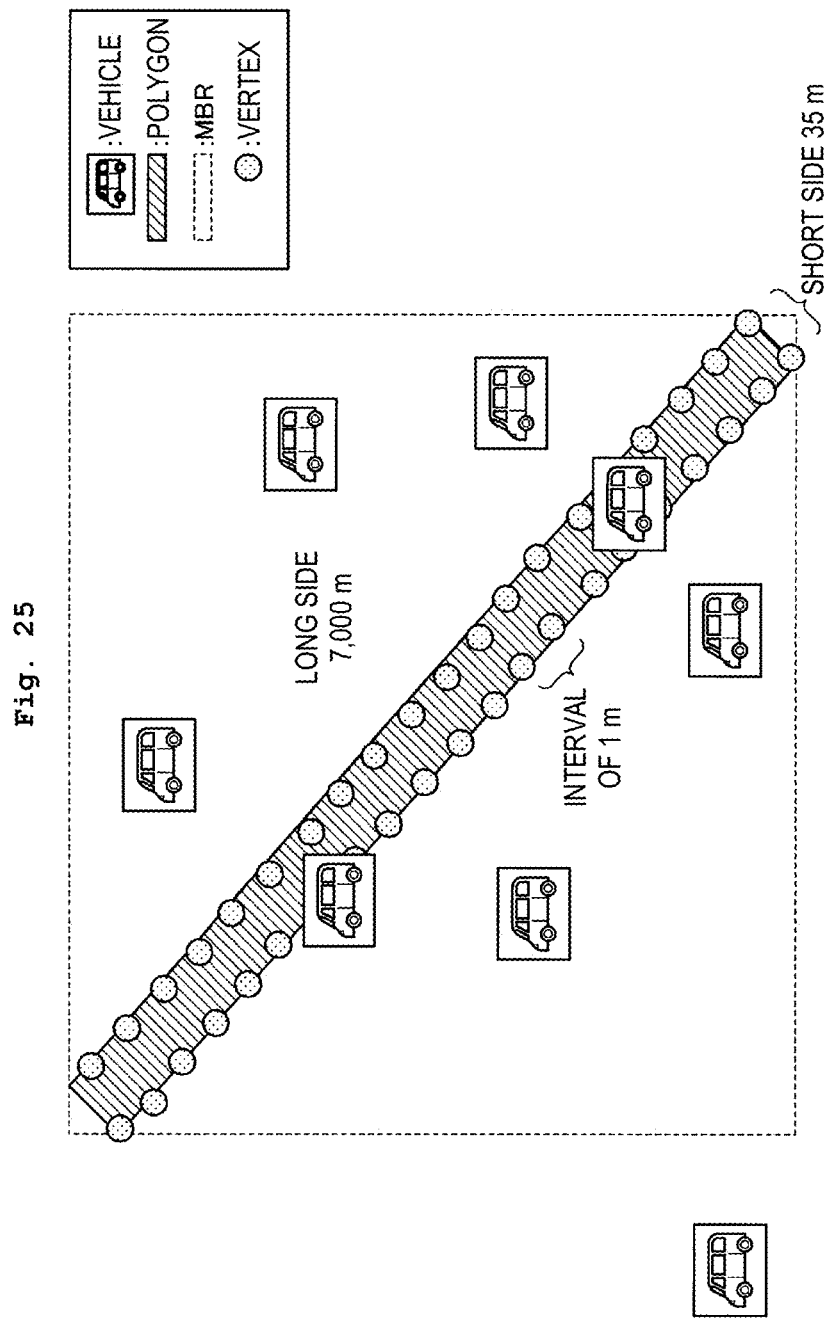
FIG. 25 is a view for explaining an experimental model.

[Verification] Comparison of performance between the determination method using the determination system in the first to the third embodiment and the determination method in related art was verified. FIG. 25 is a view for explaining an experimental model. In the present verification, one polygon as illustrated in FIG. 25 and 4000 vehicles are set as targets. The polygon illustrated in FIG. 25 is specifically a road polygon having a long side of 7000 m, a short side of 35 m, and an interval between vertexes of 1 m. Further, in the present verification, comparison is performed while three patterns of vehicles including a pattern in which a vehicle is located outside the MBR and outside the polygon, a pattern in which a vehicle is located inside the MBR and outside the polygon, and a pattern in which a vehicle is located inside the MBR and inside the polygon, are provided, and by employing average values of determination results obtained by performing trials 10 times.

First, a result of comparison between a case where inside/outside determination was performed after vertex reduction processing was performed on the road polygon as the preprocessing and a case where inside/outside determination was performed without preprocessing being performed will be described. PIP processing time in a case where the number of vertexes of the road polygon was reduced to ½, ¹⁄₁₀ and ¹⁄₁₀₀ as preprocessing, and PIP processing time in a case where inside/outside determination was performed without preprocessing being executed, were measured.

Figure 26:
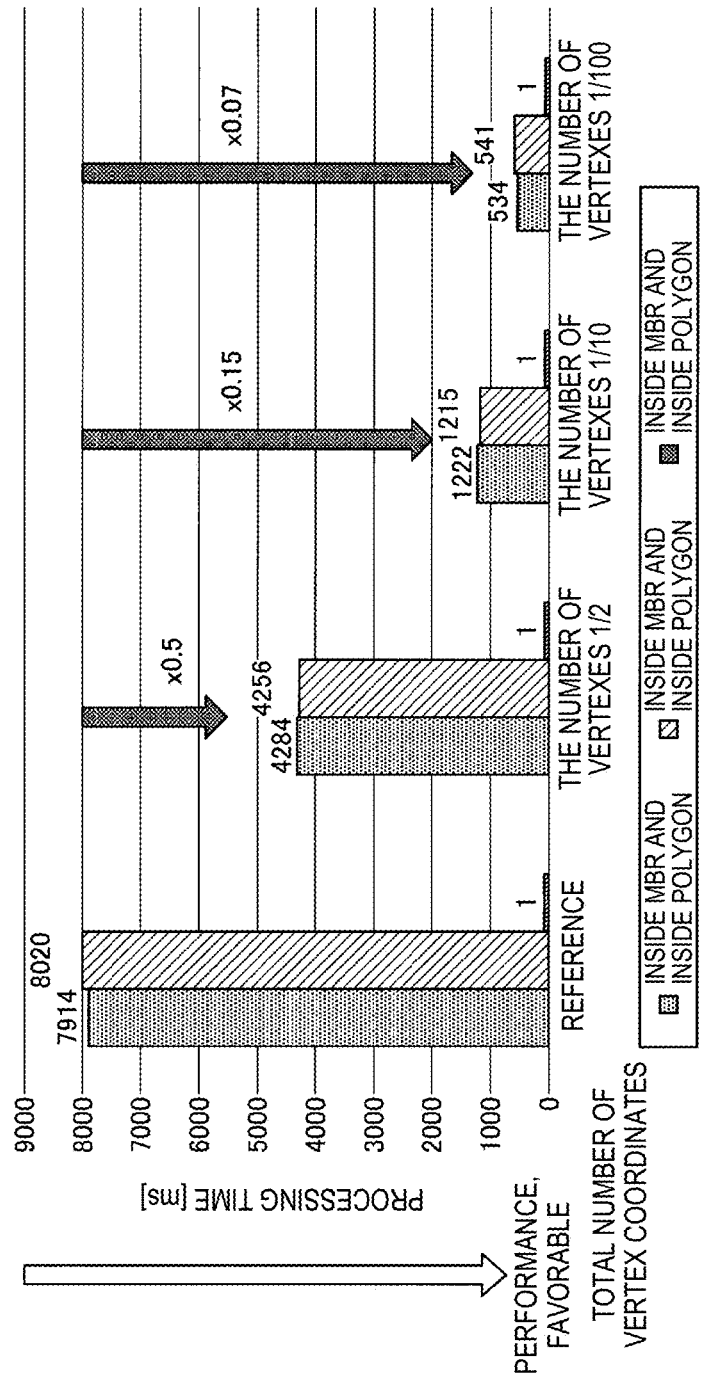
FIG. 26 is a view for explaining PIP processing time in a case where inside/outside determination is performed after vertex reduction processing is performed and in a case where inside/outside determination is performed without preprocessing being executed.

FIG. 26 is a view for explaining the PIP processing time in a case where inside/outside determination was performed after vertex reduction processing was performed and in a case where inside/outside determination was performed without preprocessing being executed. As illustrated in FIG. 26, compared to a case where inside/outside determination was performed without preprocessing being executed ("reference" case in FIG. 26), in a case where the number of vertexes was reduced to ½, ¹⁄₁₀ and ¹⁄₁₀₀, the processing time could be respectively shortened to 0.5 times, 0.15. times and 0.07 times of the PIP processing time in the reference case.

Figure 27:
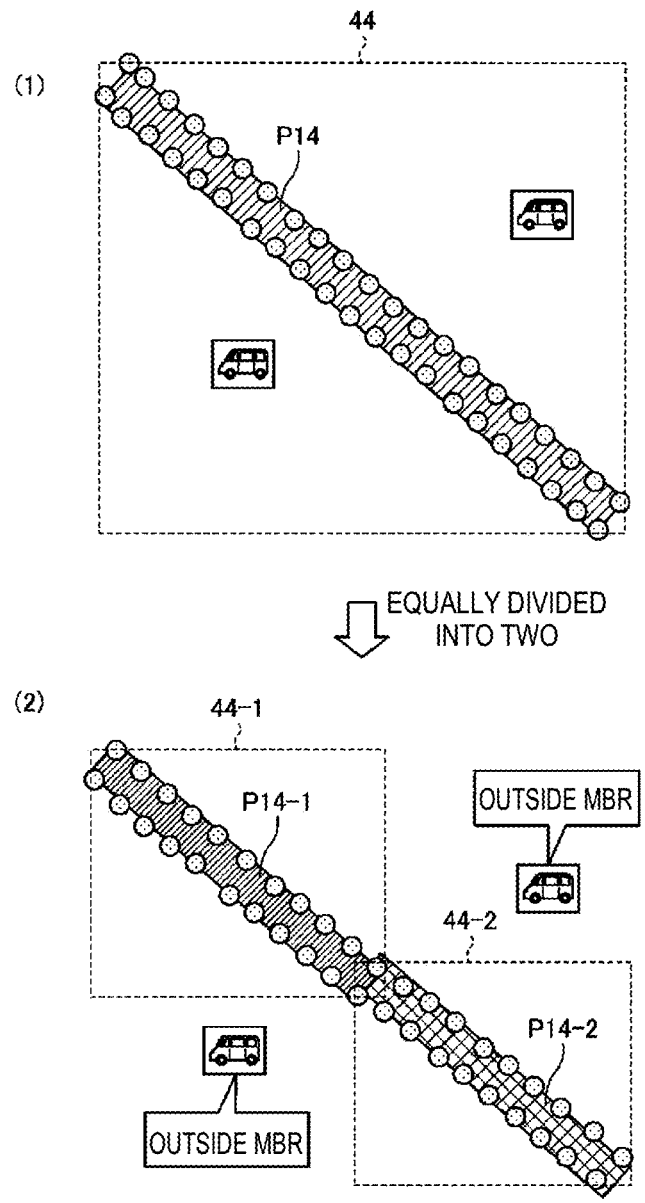
FIG. 27 is a view for explaining division processing performed in verification.

A result of comparison between a case where inside/outside determination was performed after division processing of dividing the road polygon into a plurality of polygons was performed as preprocessing and a case where inside/outside determination was performed without preprocessing being executed will be described next. FIG. 27 is a view for explaining division processing performed in the verification.

In the present verification, PIP processing time in a case where inside/outside determination was performed after preprocessing which will be described next was executed and PIP processing time in a case where inside/outside determination was performed without preprocessing being executed, were measured. The preprocessing is processing of equally dividing the road polygon P14 (see (1) of FIG. 27) into two road polygons P14-1 and P-14-2 (see (2) of FIG. 27) and dividing the MBR 44 (see (1) of FIG. 27) into MBRs 44-1 and 44-2 (see (2) of FIG. 27) whose areas are reduced compared to the MBR 44.

Figure 28:
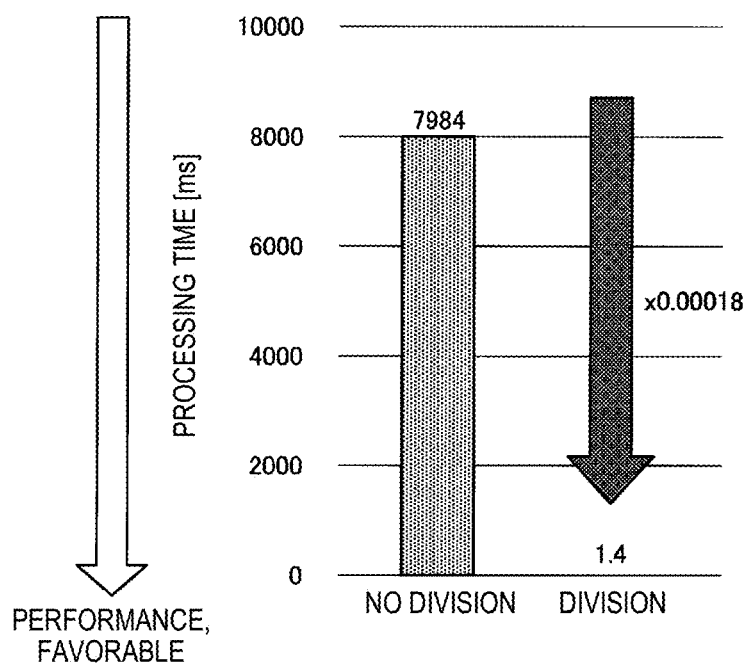
FIG. 28 is a view for explaining PIP processing time in a case where inside/outside determination is performed after division processing is performed and in a case where inside/outside determination is performed without preprocessing being executed.

FIG. 28 is a view for explaining PIP processing time in a case where inside/outside determination was performed after the division processing was performed and in a case where inside/outside determination was performed without preprocessing being executed. The experimental result indicates a model assuming that all 4000 vehicles move outside the MBR by the division processing. The model indicates such a drastic case to indicate a base of an estimated value as to how much improvement can be expected from the method.

In a case where inside/outside determination was performed without division processing being executed, total time required for 4000 vehicles located within the MBR to be subjected to PIP processing was 7984 ms ("no division" in FIG. 28). In contrast, in a case where inside/outside determination was performed after division processing was executed, all 4000 vehicles located within the MBR moved "outside the MBR", and thus, processing was finished after only simple determination was performed. In other words, it is possible to omit exterior product computation for vehicles which have moved outside the MBR by the division processing. Thus, in a case where inside/outside determination was performed after division processing was executed ("division" in FIG. 28), total time required for inside/outside determination processing performed on 4000 vehicles outside the MBR was 1.4 ms.

As a result, in a case where inside/outside determination was performed after division processing was performed, total processing time obtained by adding division processing time and PIP processing time could be shortened to 0.00018 times of processing time in a case where preprocessing is not executed.

Figure 29:
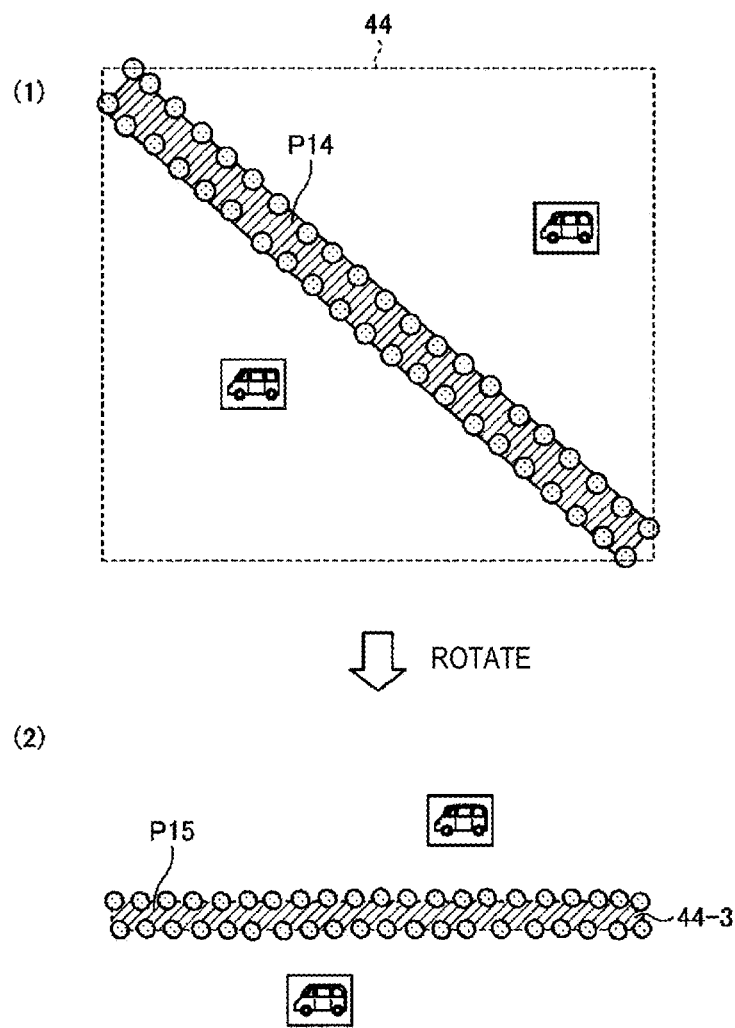
FIG. 29 is a view for explaining rotation processing performed in verification.

Further, a result of comparison between a case where inside/outside determination was performed after rotation processing of rotating the road polygon and the vehicles was performed as preprocessing and a case where inside/outside determination was performed without preprocessing being executed will be described. FIG. 29 is a view for explaining rotation processing performed in the verification.

As illustrated in FIG. 29, in the present verification, PIP processing time in a case where the road polygon P14 (see (1) of FIG. 29) and the vehicles were rotated by 45 degrees as the preprocessing (see (2) of FIG. 29), and PIP processing time in a case where inside/outside determination was performed without preprocessing being executed, were measured. As illustrated in (2) of FIG. 29, the MBR becomes an MBR 44-3 whose area is reduced compared to the MBR 44 in accordance with a road polygon P15 rotated by 45 degrees. Note that the experimental result indicates a model assuming that all 4000 vehicles have moved outside the MBR by the rotation processing. The model indicates such a drastic case to indicate a base of an estimated value as to how much improvement can be expected from the method. Further, rotation processing time is short and equal to or less than 1/10000 of the PIP processing time.

Figure 30:
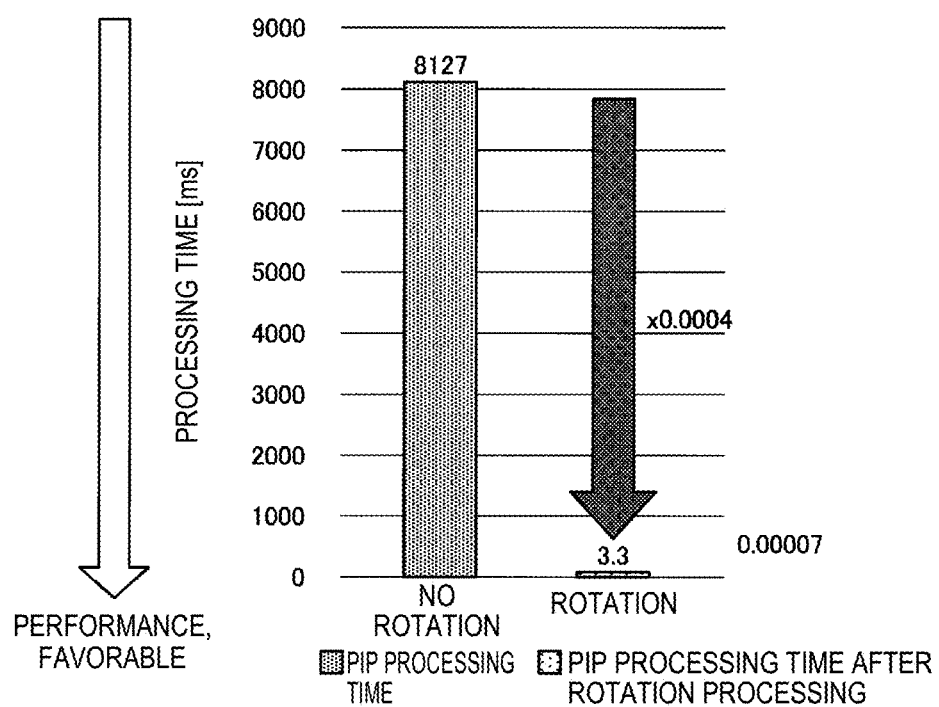
FIG. 30 is a view for explaining PIP processing time in a case where inside/outside determination is performed after rotation processing is performed and in a case where inside/outside determination is performed without preprocessing being executed.

FIG. 30 is a view for explaining PIP processing time in a case where inside/outside determination was performed after rotation processing was performed and in a case where inside/outside determination was performed without preprocessing being executed. In a case where inside/outside determination was performed without rotation processing being executed, total time required for 4000 vehicles located within the MBR to be subjected to PIP processing is 8127 ms (see "no rotation" in FIG. 30).

In contrast, in a case where inside/outside determination was performed after rotation processing was executed ("rotation" in FIG. 30), all 4000 vehicles located within the MBR have moved "outside the MBR", and thus, processing was finished after only simple determination was performed. In other words, it is possible to omit exterior product computation on vehicles which have moved outside the MBR by the rotation processing. Thus, in a case where inside/outside determination was performed after the rotation processing was executed ("rotation" in FIG. 30), total time required for inside/outside determination processing for 4000 vehicles outside the MBR was 3.3 ms.

As a result, in a case where inside/outside determination was performed after rotation processing was performed, total processing time obtained by adding rotation processing time and PIP processing time could be shortened to 0.0004 times of processing time in a case where preprocessing is not executed.

Figure 31:
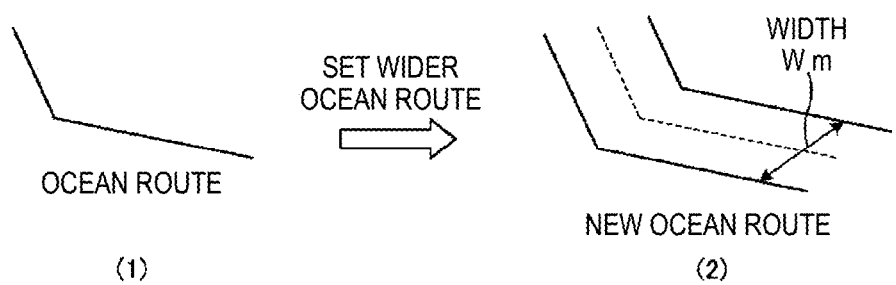
FIG. 31 is a view for explaining another application example of the determination system according to the first to the fourth embodiments.

[Other application examples] FIG. 31 is a view for explaining another application example of the determination system according to the first to the fourth embodiments. The determination system according to the first to the fourth embodiments can be applied to determination of a coordinates (area: ocean route) of ships on an ocean route. First, a width of the ocean route is expanded to W m (W can be freely set) on the basis of the ocean route (solid line indicated in (1) of FIG. 31). Then, the determination system according to the first to the fourth embodiments determines positions of ships on the ocean while replacing the road with a new ocean route and replacing the automobiles with the ships.

Further, the determination system according to the first to the fourth embodiments can be applied to tracking of fishes to which coordinate sensors are attached (area: river). Specifically, the determination system according to the first to the fourth embodiments determines positions of fishes in the river while replacing the road with the river and replacing the automobiles with the fishes.

[System configuration of embodiments] Respective components of the vertex reduction device 10 illustrated in FIG. 2, the determination device 20 illustrated in FIG. 4, the rotation device 210 illustrated in FIG. 11 and the division device 310 illustrated in FIG. 16 indicate functional concept, and do not necessarily have to be physically constituted as illustrated. In other words, specific forms of distribution and integration of the functions of the vertex reduction device 10, the determination device 20, the rotation device 210 and the division device 310 are not limited to those illustrated, and all or part can be functionally or physically distributed or integrated in arbitrary unit in accordance with various loads and usage conditions.

Further, all or arbitrary part of respective kinds of processing to be performed at the vertex reduction device 10, the determination device 20, the rotation device 210 and the division device 310 may be implemented by a CPU and programs to be analyzed and executed by the CPU. Further, respective kinds of processing to be performed at the vertex reduction device 10 may be implemented as hardware using wired logic.

Further, among respective kinds of processing described in the embodiments, all or part of processing described as being automatically performed can be manually performed. Alternatively, all or part of processing described as being manually performed can be automatically performed using a publicly known method. Further, information including the processing procedure, control procedure, specific name, various kinds of data and parameters described above and illustrated can be changed as appropriate unless otherwise specified.

Figure 32:
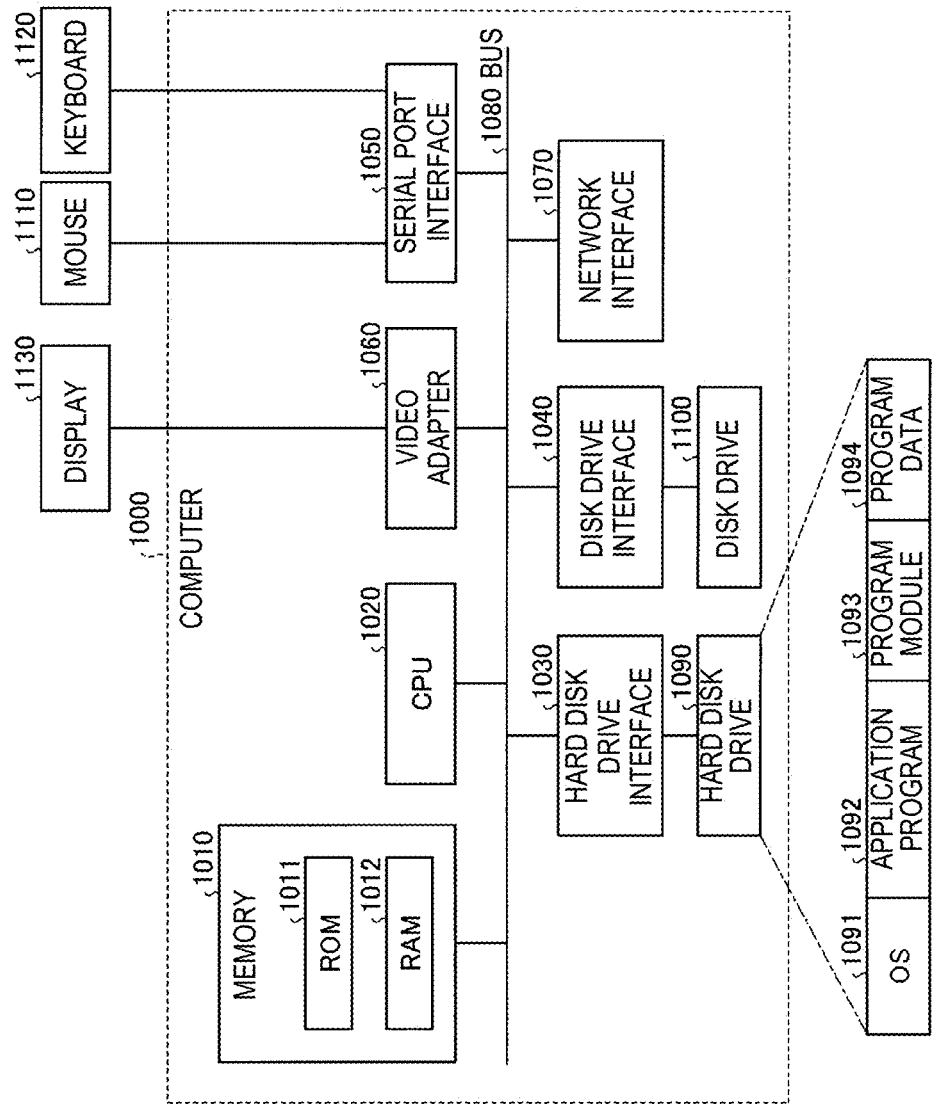
FIG. 32 is a view illustrating an example of a computer which implements the vertex reduction device, the determination device, the rotation device and the division device by programs being executed.

[Program] FIG. 32 is a view illustrating an example of a computer which implements the vertex reduction device 10, the determination device 20, the rotation device 210 and the division device 310 by programs being executed. A computer 1000 includes, for example, a memory 1010 and a CPU 1020. Further, the computer 1000 includes a hard disk drive interface 1030, a disk drive interface 1040, a serial port interface 1050, a video adapter 1060, and a network interface 1070. These components are connected with a bus 1080.

The memory 1010 includes a ROM 1011 and a RAM 1012. The ROM 1011 stores, for example, a boot program such as a BIOS (Basic Input Output System). The hard disk drive interface 1030 is connected to a hard disk drive 1090. The disk drive interface 1040 is connected to a disk drive 1100. For example, a detachable storage medium such as a magnetic disk and an optical disk is inserted into the disk drive 1100. The serial port interface 1050 is connected to, for example, a mouse 1110 and a keyboard 1120. The video adapter 1060 is, for example, connected to a display 1130.

The hard disk drive 1090 stores, for example, an OS (Operating System) 1091, an application program 1092, a program module 1093, and program data 1094. In other words, programs which specify respective kinds of processing of the vertex reduction device 10, the determination device 20, the rotation device 210 and the division device 310 are implemented as the program module 1093 which describes codes which can be executed by the computer 1000. The program module 1093 is stored in, for example, the hard disk drive 1090. For example, the program module 1093 for executing processing similar to functional components of the vertex reduction device 10, the determination device 20, the rotation device 210 and the division device 310 is stored in the hard disk drive 1090. Note that the hard disk drive 1090 may be substituted with an SSD (Solid State Drive).

Further, setting data used in the processing in the above-described embodiments is stored in, for example, the memory 1010 or the hard disk drive 1090 as the program data 1094. Further, the CPU 1020 reads out the program module 1093 and the program data 1094 stored in the memory 1010 or the hard disk drive 1090 to the RAM 1012 as necessary and executes the program module 1093 and the program data 1094.

Note that the program module 1093 and the program data 1094 may be stored in, for example, a detachable storage medium, as well as being stored in the hard disk drive 1090, and may be read out by the CPU 1020 via the disk drive 1100, or the like. Alternatively, the program module 1093 and the program data 1094 may be stored in other computers connected via a network (such as a LAN (Local Area Network) and a WAN (Wide Area Network)). Further, the program module 1093 and the program data 1094 may be read out from other computers by the CPU 1020 via the network interface 1070.

While the embodiments to which the invention made by the present inventor is applied have been described above, the present invention is not limited to description and the drawings of the present embodiments which are part of disclosure of the present invention. In other words, other embodiments, examples and operational technologies implemented by a person skilled in the art, or the like, on the basis of the present embodiments, are incorporated into a scope of the present invention.

REFERENCE SIGNS LIST

1, 201, 301, 401 Determination system
2 Client terminal
3 Inside/outside determination control device
10 Vertex reduction device
11, 21, 211, 311 Communication unit
12, 22, 212, 312 Storage unit
13, 23, 213, 313 Control unit
20 Determination device
131 Vertex reduction unit
231 Inside/outside determination unit
210 Rotation device
310 Division device
2131 Rotation unit
3131 Division unit

The invention claimed is:

1. A preprocessing device comprising:
processing circuitry configured to:
acquire coordinate information of respective vertexes of a polygon for inside/outside determination and the coordinate information of the respective vertexes of the polygons;
rotate a coordinate to be determined and the polygon to cause the polygon to fit within a minimum bounding rectangle having a minimum area to encompass the polygon as preprocessing of determination processing of determining whether the coordinate to be determined exists inside or outside the polygon; and
output coordinate information of respective vertexes of the rotated polygon and the rotated coordinate,
wherein inside/outside determination is performed based on the respective vertexes of the rotated polygon and the rotated coordinate information.

2. The preprocessing device according to claim 1, wherein the processing circuitry is further configured to reduce a number of vertexes of the polygon.

3. The preprocessing device according to claim 2, wherein the processing circuitry is further configured to reduce the number of vertexes using a Ramer-Douglas-Peucker algorithm.

4. The preprocessing device according to claim 1, wherein the coordinate corresponds to an automobile and the polygon corresponds to a road area.

5. A determination system comprising:
a determination device including processing circuitry configured to perform determination processing of determining whether a coordinate to be determined exists inside or outside a polygon for inside/outside determination; and
a first preprocessing device including first processing circuitry configured to perform preprocessing of the determination processing,
the first processing circuitry being configured to:
acquire coordinate information of respective vertexes of the polygon for inside/outside determination and the coordinate information of the respective vertexes of the polygon,
rotate the coordinate and the polygon to cause the polygon to fit within a minimum bounding rectangle having a minimum area to encompass the polygon as preprocessing, and
output coordinate information of respective vertexes of the rotated polygon and the rotated coordinate as rotated coordinate information,
the processing circuitry being configured to determine whether the coordinate exists inside or outside the polygon using the respective vertexes of the rotated polygon and the rotated coordinate.

6. The determination system according to claim 5, further including:
a second preprocessing device including second processing circuitry configured to perform preprocessing of the determination processing,
the second processing circuitry being configured to:
acquire the coordinate information of the respective vertexes of the polygon and divide the polygon into a plurality of sub-polygons as preprocessing, and
output coordinate information of respective vertexes of the sub-polygons as divided polygon information.

7. The determination system according to claim 6, wherein the second processing circuitry is further configured to divide the polygon into the sub-polygons using a polygon triangulation algorithm.

8. The determination system according to claim 6, wherein the processing circuitry is further configured to determine bounding rectangles for the sub-polygons.

9. The determination system according to claim 8, wherein the bounding rectangles for the sub-polygons each have a minimum area that encompasses a respective one of the sub-polygons.

10. The determination system according to claim 5, wherein to determine whether the coordinate exists inside or outside the polygon, the processing circuitry is further configured to
determine whether the coordinate is inside or outside the bounding rectangle, and
indicate that the coordinate is not within the polygon in a case that the processing circuitry determines the coordinate to be outside the bounding rectangle.

11. The determination system according to claim 10, wherein, in a case that the circuitry determines that the coordinate is inside the bounding rectangle, the processing circuitry is configured to perform a detailed determination of whether the coordinate is inside the polygon.

12. The determination system according to claim 11, wherein the processing circuitry is configured to perform the detailed determination using a crossing number method.

13. The determination system according to claim 11, wherein the processing circuitry is configured to perform the detailed determination using a winding number method.

14. The determination system according to claim 5, wherein the processing circuitry is further configured to reduce a number of vertexes of the polygon.

15. The determination system according to claim 14, wherein the processing circuitry is further configured to reduce the number of vertexes using a Ramer-Douglas-Peucker algorithm.

16. The determination system according to claim 5, wherein the coordinate corresponds to an automobile and the polygon corresponds to a road area.

17. A preprocessing method comprising:
- acquiring coordinate information of respective vertexes of a polygon for inside/outside determination and the coordinate information of the respective vertexes of the polygon;
- rotating a coordinate to be determined and the polygon to cause the polygon to fit within a minimum bounding rectangle having a minimum area to encompass the polygon as preprocessing of determination processing of determining whether the coordinate exists inside or outside the polygon, by processing circuitry; and
- outputting coordinate information of respective vertexes of the rotated polygon and the rotated coordinate,
- wherein inside/outside determination is performed based on the respective vertexes of the rotated polygon and the rotated coordinate information.

18. The preprocessing method according to claim 17, wherein the coordinate corresponds to an automobile and the polygon corresponds to a road area.

19. The preprocessing method according to claim 17, further comprising reducing a number of vertexes of the polygon.

* * * * *